(12) United States Patent
Smith et al.

(10) Patent No.: US 9,536,278 B2
(45) Date of Patent: Jan. 3, 2017

(54) GRAPHICS PROCESSING OF A VERTEX BUFFER USING A RELATIVE INDEX BUFFER

(71) Applicant: Intel Corporation, Santa Clara, CA (US)

(72) Inventors: Jacob N. Smith, Spicewood, TX (US); Jason M. Surprise, Beaverton, OR (US); Zack S. Waters, Portland, OR (US)

(73) Assignee: Intel Corporation, Santa Clara, CA (US)

(*) Notice: Subject to any disclaimer, the term of this patent is extended or adjusted under 35 U.S.C. 154(b) by 279 days.

(21) Appl. No.: 14/092,249

(22) Filed: Nov. 27, 2013

(65) Prior Publication Data

US 2015/0145880 A1 May 28, 2015

(51) Int. Cl.
G06T 1/60 (2006.01)
G06T 11/40 (2006.01)

(52) U.S. Cl.
CPC ........ *G06T 1/60* (2013.01); *G06T 11/40* (2013.01)

(58) Field of Classification Search
CPC .................................................... G06T 1/60
See application file for complete search history.

(56) References Cited

U.S. PATENT DOCUMENTS

| 7,209,139 B1* | 4/2007 | Keet et al. .................. 345/427 |
| 2004/0186972 A1* | 9/2004 | Chow et al. ................. 711/165 |
| 2004/0201592 A1* | 10/2004 | Huang .......................... 345/558 |
| 2006/0022977 A1* | 2/2006 | Bronder ................. G06T 17/20 345/424 |
| 2006/0176310 A1* | 8/2006 | Arnaud et al. ................ 345/582 |
| 2009/0073177 A1* | 3/2009 | Jiao et al. ..................... 345/501 |

OTHER PUBLICATIONS

"Rendering from Vertex and Index Buffers (Direct3D 9)," Microsoft, retrieved from http://msdn.microsoft.com/en-us/library/windows/desktop/bb147325(v=vs.85).aspx on Nov. 26, 2013, 3 pages.
Wikipedia, "Raster graphics," retrieved from http://en.wikipedia.org/wiki/Raster_graphics on Nov. 26, 2013, 3 pages.
Wikipedia, "Rasterisation," retrieved from http://en.wikipedia.org/wiki/Rasterisation on Nov. 26, 2013, 8 pages.
OpenGL.org, "Vertex Specification," retrieved from http://www.opengl.org/wiki/Vertex_Specification on Nov. 26, 2013, 16 pages.

* cited by examiner

*Primary Examiner* — Ke Xiao
*Assistant Examiner* — Kim-Thanh T Tran
(74) *Attorney, Agent, or Firm* — Hanley, Flight & Zimmerman, LLC

(57) ABSTRACT

Methods, apparatus and articles of manufacture for graphics processing of a vertex buffer using a relative index buffer are disclosed. Example methods to process a vertex buffer disclosed herein include accessing a first relative index stored in a relative index buffer, the first relative index specifying an offset from a current index selecting a first entry of the vertex buffer. Such disclosed example methods also include, in response to the first relative index being a nonzero value, processing data associated with a second entry of the vertex buffer to determine a rasterizer output associated with the first entry of the vertex buffer, the second entry of the vertex buffer being selected using the current index offset by the first relative index.

21 Claims, 8 Drawing Sheets

GRAPHICS PROCESSING OF A VERTEX BUFFER USING A RELATIVE INDEX BUFFER

FIELD OF THE DISCLOSURE

This disclosure relates generally to graphics processing and, more particularly, to graphics processing of a vertex buffer using a relative index buffer.

BACKGROUND

In graphics processing, rasterization refers to an image rendering process in which an image described in a vector graphics format using polygons, such as triangles, is converted into a raster image containing pixels. For example, a rasterizer may process an input vertex buffer containing vertex data specifying the vertices of the triangles making up an input image to produce an output raster image capable of being output on a video display, printed by a printer, saved to a storage medium, etc. Rasterization may include, or may be preceded by, other graphics processing operations, such as (1) performing one or more transformation operations (e.g., translation, scaling, rotation, etc.) on the triangles represented by the vertices in the vertex buffer, (2) performing clipping to truncate the triangles to fit within a defined viewing area of the output image, (3) performing shading to adjust the visual characteristics (e.g., color, brightness, texture, etc.) of the triangles represented by the vertices in the vertex buffer, etc.

In at least some examples, rasterizers may process the input vertex buffer using a walking counter (or similar mechanism) to access vertex buffer entries (also referred to herein as vertex buffer elements) in-order for rasterization. Additionally or alternatively, rasterizers may use a separate absolute index buffer storing a sequence of absolute vertex buffer indices for use in accessing different entries of the vertex buffer.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
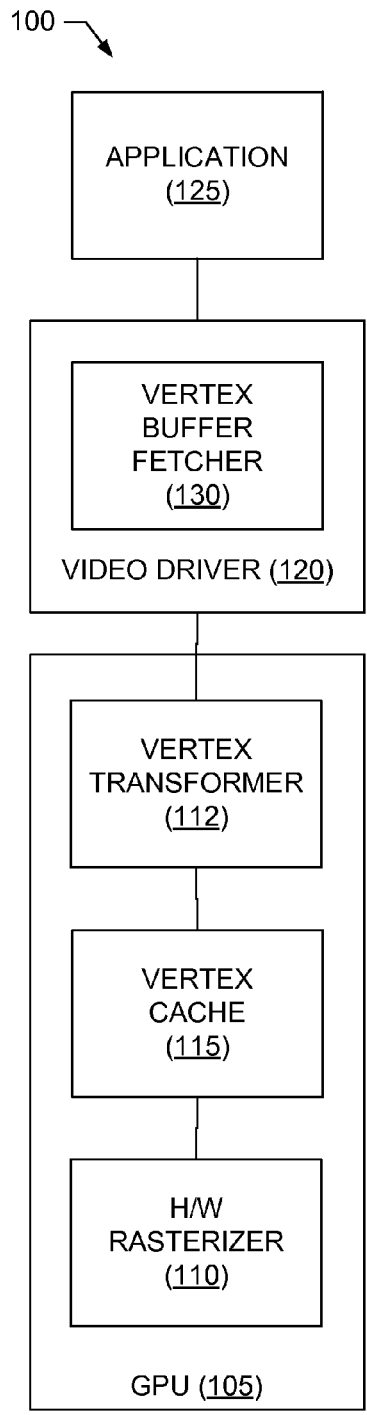
FIG. 1 is a block diagram of a first example graphics rendering system capable of processing a vertex buffer using a relative index buffer as disclosed herein.

Methods, apparatus, systems and articles of manufacture (e.g., physical storage media) to perform graphics processing of a vertex buffer using a relative index buffer are disclosed herein. Disclosed example methods to process a vertex buffer include accessing a first relative index stored in a relative index buffer. In such examples, the first relative index specifies an offset from a current index selecting a first entry of the vertex buffer. In response to the first relative index being a nonzero value, such disclosed example methods also include processing data associated with a second entry of the vertex buffer to determine a rasterizes output associated with the first entry of the vertex buffer. In such examples, the second entry of the vertex buffer is selected using the current index offset by the first relative index.

Some disclosed example methods further include fetching and processing the first entry of the vertex buffer to determine a rasterizer output associated with the first entry of the vertex buffer in response to the first relative index being zero.

In some disclosed example methods, the first relative index is associated with the first entry of the vertex buffer, and the first relative index is selected from the relative index buffer using the current index. Additionally or alternatively, in some such example methods, the relative index buffer stores relative indexes associated with respective entries of the vertex buffer. Furthermore, in some such examples, the relative index buffer is accessed iteratively using the current index, and the current index is incremented at each iteration of accessing the relative index buffer.

In some disclosed example methods, the data associated with the second entry of the vertex buffer is cached data associated with the second entry of the vertex buffer. Additionally, in some such example methods, processing the data associated with the second entry of the vertex buffer can include calculating an index value corresponding to the current index offset by the first relative index, and calling a rasterizer using the index value. In some such examples, calling the rasterizer using the index value causes the hardware rasterizer to access the cached data associated with the second entry of the vertex buffer.

In some disclosed example methods, processing the data associated with the second entry of the vertex buffer can include accessing first data from a vertex cache when the vertex cache is present. In such examples, the first data was obtained from previous rasterization processing associated with the second entry of the vertex buffer and stored in the vertex cache. However, when the vertex cache is not present, such example methods can also include fetching second data included in the second entry of the vertex buffer, and performing rasterization using the fetched second data.

Some disclosed example methods further include comparing entries of the vertex buffer with past entries of the vertex buffer within a prior number of vertex buffer entries. For example, the prior number of entries can be based on a relative index size. In response to determining that the first entry of the vertex buffer matches the second entry of the vertex buffer, such example methods also include, setting the first relative index equal to an offset between the first entry of the vertex buffer and the second entry of the vertex buffer.

These and other example methods, apparatus, systems and articles of manufacture (e.g., physical storage media, such as storage devices and/or storage disks) to perform rasterization of a vertex buffer using a relative index buffer are disclosed in greater detail below.

As noted above, in at least some examples, rasterizers used for graphics processing may be configured to access entries of a vertex buffer using an absolute index buffer storing a sequence of absolute vertex buffer indices pointing to specific entries of the vertex buffer. Under such a configuration, a rasterizer can retrieve the absolute indices from the absolute index buffer sequentially (e.g., iteratively), and then access the respective vertex buffer entries indexed by the retrieved absolute indices. The use of such an absolute index buffer can allow entries of the vertex buffer to be re-used and/or accessed out-of-order, potentially enabling the total number of vertex buffer entries to be reduced. However, there are several potential drawbacks with using an absolute index buffer to process a vertex buffer. For example, use of an absolute index buffer to access entries of the vertex buffer may also incur additional processing overhead (e.g., associated with creating the absolute index buffer and retrieving the absolute vertex buffer indices from the absolute index buffer) relative to use of a walking counter to access entries of the vertex buffer in-order. Also, absolute index buffers are not usually compressible, and the size of the absolute indices can be large and also can place an arbitrary bound on the number of vertices capable of being addressed. Additionally, absolute index buffers may not be able to readily account for mutation of the vertex data.

As further noted above, in at least some examples, rasterizers used for graphics processing may additionally or alternatively be configured to use a walking counter or similar mechanism to iteratively access vertex buffer entries in-order (e.g., sequentially). Under such a configuration, a rasterizer may incur less processing overhead than a rasterizer configured to use absolute index buffers to access the entries of the vertex buffer. However, rasterizers configured to access the vertex buffer entries in-order may also suffer from potential drawbacks. For example, because the vertex buffer entries are accessed sequentially, such rasterizers are unable to take advantage of redundancies in the vertex data included in the vertex buffer. Accordingly, rasterizers configured to access the vertex buffer entries in-order may waste processing power to rasterize duplicate vertex data in the vertex buffer.

Graphics processing of vertex buffers using relative index buffers, as disclosed herein, can overcome at least some of the foregoing deficiencies (and/or other deficiencies) of prior techniques. As described in greater detail below, a relative index buffer associated with a vertex buffer stores a sequence of relative indices corresponding to respective entries of the vertex buffer. For a given vertex buffer entry, the corresponding relative index in the relative index buffer specifies an offset (e.g., such as a number of vertex buffer entries) from the given vertex buffer entry to a matching prior vertex buffer entry. In this way, the relative index buffer stores information (e.g., the relative indices) describing the redundancy in its associated vertex buffer. Accordingly, unlike prior techniques that access vertex buffer entries in-order, the disclosed graphics processing techniques are able to use the disclosed relative index buffers to exploit redundancy in the vertex data contained in vertex buffers. Additionally, compared with the absolute index buffers used in other prior techniques, the disclosed relative index buffers contain relative indices that can be substantially smaller than the absolute indices contained in the absolute index buffers. Furthermore, unlike the prior absolute index buffers, the disclosed relative index buffers do not place an arbitrary bound on the number of vertices capable of being addressed, are amenable to compression, can be readily used with mutating data, and can be tuned to the characteristics of an output vertex cache included in the graphics processing pipeline. These and other potential benefits of using relative index buffers for graphics processing of vertex buffers, as disclosed herein, will become apparent through the following disclosure.

Figure 3:
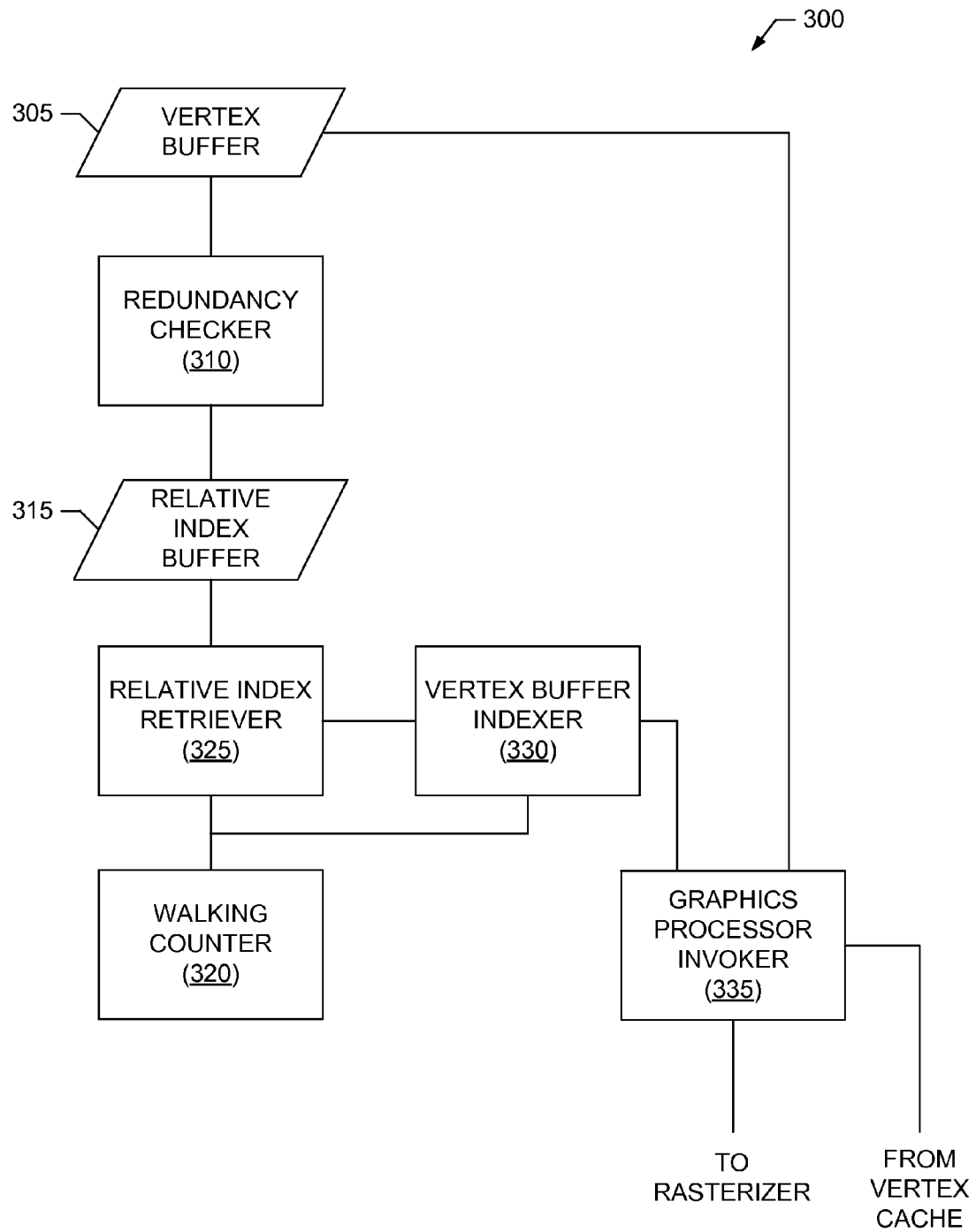
FIG. 3 is a block diagram of an example vertex buffer fetcher for processing a vertex buffer using a relative index buffer in the example graphics rendering systems of FIGS. 1 and/or 2.
Figure 4:
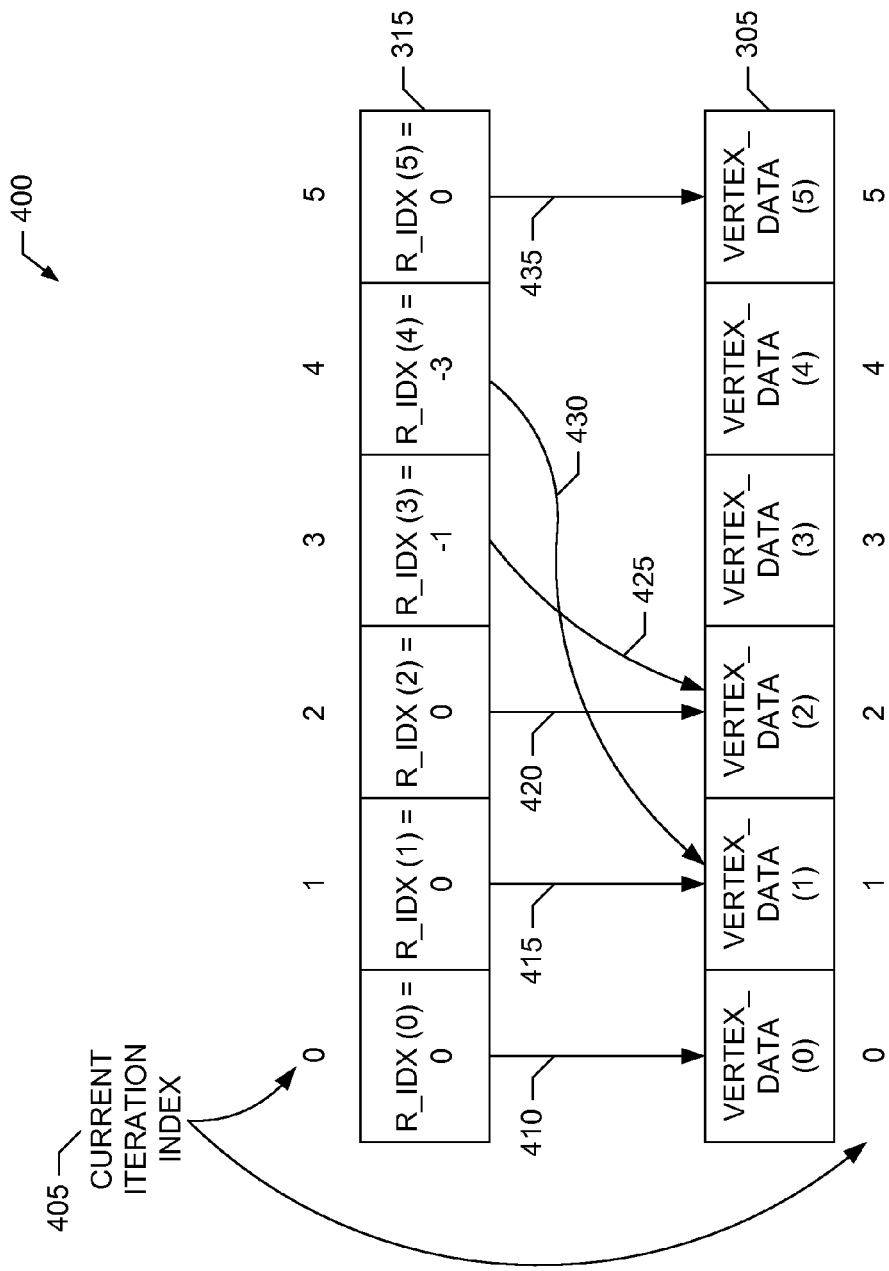
FIG. 4 illustrates an example operation of the vertex buffer fetcher of FIG. 3 to access vertex buffer entries using a relative index buffer.

Turning to the figures, a first example graphics rendering system 100 capable of performing graphics processing of a vertex buffer using a relative index buffer as disclosed herein is illustrated in FIG. 1. The first example graphics rendering system 100 includes an example hardware-based graphics processor 105, also referred to as a graphics processing unit (GPU) 105, to perform hardware-based rendering of input vertex buffers to generate output raster images. As described above, a vertex buffer, such as the example vertex buffer 305 illustrated in FIG. 3 and described in greater detail below, contains a sequence of vertex data specifying the vertices of triangles making up an input image described in a vector graphics format. The vertex data for a given vertex stored in the vertex buffer can include, but is not limited to, location data (e.g., specifying the location of the vertex in two or three dimensions), color data, texture data, etc. For example, the first entry of the vertex buffer may contain the vertex data for a first vertex of a triangle making up an image to be rendered, the second entry of the vertex buffer may contain the vertex data for a second vertex of the image, the third entry of the vertex buffer may contain the vertex data for a third vertex of the image, etc. A further example implementation of the vertex buffer 305 of FIG. 3 is illustrated in FIG. 4, which is described in greater detail below.

The GPU 105 of the illustrated example can be implemented by any type of GPU technology, such as any of the family of Intel® graphic media accelerators (GMAs), any of the family of Advanced Micro Devices (AMD)® GPUs, any of the family of NVIDIA® GPUs, etc. For example, the GPU 105 of FIG. 1 includes an example hardware (H/W) rasterizer 110 implementing, in any appropriate manner, one or more rasterization operations to be performed on input vertex data to generate the pixel data representing the output raster image. The GPU 105 of the illustrated example also include an example vertex transformer 112 to perform one or more pre-processing operations on vertex data prior to the vertex data being processed by the H/W rasterizer 110. Examples of such pre-processing operations that may be implemented by the vertex transformer 112 include, but are not limited to, (1) one or more transformation operations, such as a translation operation, a scaling operation, a rotation operation, etc., to be performed on the triangles represented by the vertices in the input vertex buffer, (2) a clipping operation to truncate the triangles represented by the vertices in the input vertex buffer to fit within a defined viewing area of the output image, (3) a shading operation to adjust the visual characteristics (e.g., color, brightness, texture, etc.) of the triangles represented by the vertices in the input vertex buffer, etc. The vertex data output by the vertex transformer 112 for processing by the H/W rasterizer 110 is also referred to herein as transformed vertex data. In the illustrated example, the GPU 105 also include one or more example vertex caches 115 to store the transformed vertex data generated by the pre-processing operation(s) implemented by the vertex transformer 112 prior to rendering of the vertex data by the H/W rasterizer 110 into the pixels forming the output raster image. The vertex cache(s) 115 may be implemented by any type(s) and/or number of caches, memories, storage devices, etc.

In the illustrated example of FIG. 1, the GPU 105 is controlled by an example video driver 120, which may be implemented, for example, in hardware, software, or any combination thereof. The video driver 120 of the illustrated example obtains an input vertex buffer, such as the example vertex buffer 305 of FIG. 3, for rendering from one or more applications, such as an example application 125, capable of generating image and/or video data to be displayed or otherwise output by an output device. For example, the application 125 can correspond to a video game, a media player, a word and/or other data processing program, a web browser, etc.

After obtaining the input vertex buffer from the application 125, the example video driver 120 of FIG. 1 selects entries of the vertex buffer for rendering. In the illustrated example, the video driver 120 includes an example vertex buffer fetcher 130 to select the entries of the vertex buffer using a relative index buffer, such as the example relative index buffer 315 illustrated in FIG. 3 and described in greater detail below, in accordance with the examples disclosed herein. As described above and in greater detail below, the relative index buffer associated with the particular input vertex buffer stores a sequence of relative indices corresponding to respective entries of the vertex buffer. For a given vertex buffer entry, the corresponding relative index in the relative index buffer specifies an offset (e.g., such as a number of vertex buffer entries) from the given vertex buffer entry to a matching prior vertex buffer entry. A further example implementation of the relative index buffer 315 of FIG. 3 is illustrated in FIG. 4, which is described in greater detail below.

In the illustrated example of FIG. 1, the vertex buffer fetcher 130 iteratively accesses, in-order, successive entries of the relative index buffer for the input vertex buffer to determine a relative index corresponding to a next entry of the vertex buffer to be fetched and rendered. As described in greater detail below, during a given iteration in which a current vertex buffer entry is to be fetched and rendered, the respective relative index retrieved from the relative index buffer for that iteration specifies an offset between the current vertex buffer entry and a prior matching vertex buffer entry, if one exists (e.g., within the offset addressable by the relative indices). For example, if the relative index retrieved during a given iteration is equal to zero (0), then there are no prior vertex entries (e.g., within the offset addressable by the relative indices) that match the current vertex buffer entry corresponding to the retrieved relative index. However, if the relative index retrieved during a given iteration is a non-zero value, then the current vertex buffer entry corresponding to the retrieved relative index has a matching prior vertex buffer entry located at an offset from the current entry in the vertex buffer equal to the value of the retrieved relative index.

In the illustrated example of FIG. 1, to cause the GPU 105 to render a given entry of the vertex buffer, the vertex buffer fetcher 130 passes a pointer to the start of the vertex buffer and a vertex buffer index identifying the vertex buffer entry to be rendered to the GPU 105. As described in greater detail below, during a given iteration in which a current vertex buffer entry is to be fetched and rendered, the vertex buffer fetcher 130 of the illustrated example determines the vertex buffer index identifying the actual vertex buffer entry to be fetched and rendered to be a current iteration index (e.g., corresponding to the current relative index buffer entry and the corresponding current vertex buffer entry being processed) offset by the value of the relative index located at the current iteration index in the relative index buffer. For example, if the relative index for a current iteration is a nonzero value, then there is a prior vertex buffer entry that matches the current vertex buffer entry and the vertex buffer index, which is set to the current iteration index offset by the relative index, points to that matching prior vertex buffer entry. In this example, when the GPU 105 receives, from the vertex buffer fetcher 130, the vertex buffer index to be used to fetch and render the current vertex buffer entry for the current processing iteration, the vertex buffer index actually points to the matching prior vertex buffer entry. Because the GPU 105 has already processed that prior vertex buffer entry, the GPU 105 may detect that there is cached, transformed vertex data for that prior vertex buffer entry available in the vertex cache 115. Thus, the GPU 105 may be able to fetch the cached vertex data for the prior vertex entry from the cache 115, instead of wasting resources to fetch and perform one or more intermediate operations (e.g., using the vertex transformer 112) on the current entry from the vertex buffer.

However, if the relative index for a current iteration is zero, then there is no prior vertex buffer entry matching the current vertex buffer entry and the vertex buffer index, therefore, equals the current iteration index. In such an example, when the GPU 105 receives, from the vertex buffer fetcher 130, the vertex buffer index to be used to fetch and render the current vertex buffer entry for the current processing iteration, the vertex buffer index points to the current vertex buffer entry. Because the GPU 105 has not yet processed the current vertex buffer entry (or has not processed a similar entry within a past number of iterations able to be stored in the vertex cache 115), the GPU 105 may detect that there is no cached vertex data for that current vertex buffer entry. Thus, the GPU 105 may fetch the vertex data for the current vertex entry from the vertex buffer and process the fetched vertex data with, for example, the vertex transformer 112 and the H/W rasterizer 110.

Accordingly, in some examples, the size (e.g., in terms of number of bits, such as 4 bits, 8 bits, 16 bits, etc.) of the relative indices stored in the relative index buffer may be tailored to correspond to the size of the vertex cache(s) 115 included in the GPU 105. For example, the size of the relative indices stored in the relative index buffer may be specified such that the maximum offset capable of being represented by a relative index is equal to, or otherwise is based on, the depth of the vertex cache(s) 115 (or, in other words, the number of vertex entries capable of being stored in the vertex cache(s) 115). For example, if a vertex cache 115 has a depth of 256 entries and, thus, can cache 256 vertices, the relative indices in the relative index buffer may be specified to have a size of 8 bits, because $2^8=256$.

As described in greater detail below, in some examples, the vertex buffer fetcher 130 performs a redundancy checking procedure to generate the respective relative index buffer to be associated with an input vertex buffer when the vertex buffer is initially obtained by the video driver 120. After determining the relative index buffer for the vertex buffer, the vertex buffer fetcher 130 can further store the relative index buffer and its association with the vertex buffer for future rendering of this same vertex buffer (e.g., to avoid having to regenerate the relative index buffer in the future). For example, the vertex buffer fetcher 130 can generate identification information (e.g., via a hash function and/or other technique) for the vertex buffer and its relative index buffer, and use this identification information to link the relative index buffer with the vertex buffer.

Figure 2:
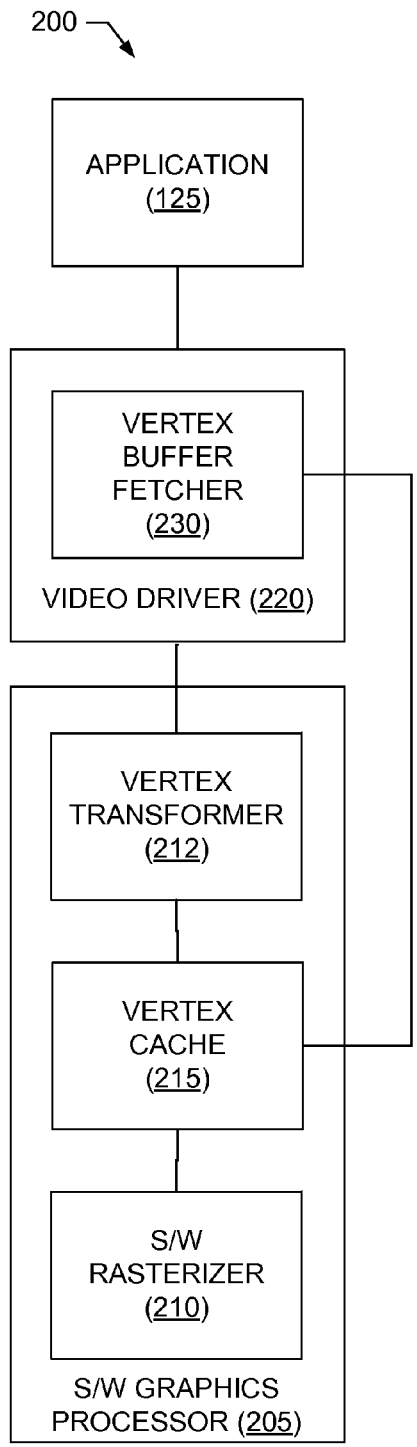
FIG. 2 is a block diagram of a second example graphics rendering system capable of processing a vertex buffer using a relative index buffer as disclosed herein.

A second example graphics rendering system 200 capable of performing rasterization of a vertex buffer using a relative index buffer as disclosed herein is illustrated in FIG. 2. The second example graphics rendering system 200 performs uses an example software graphics processor 205 to perform software-based rendering of input vertex buffers to generate output raster images. Accordingly, the software graphics processor 205 in the graphics rendering system 200 of the illustrated example includes an example software (S/W) rasterizer 210 implementing, in any appropriate manner, one or more rasterization operations to be performed on input vertex data to generate the pixel data representing the output raster image. Similar to the vertex transformer 112 of FIG. 1, the graphics processor 205 of the illustrated example also include an example vertex transformer 212 to perform one or more pre-processing operations on vertex data prior to the vertex data being processed by the S/W rasterizer 210. Examples of the pre-processing operations that may be implemented by the vertex transformer 212 include, but are not limited to, one or more transformation operations, a clipping operation, a shading operation, etc. The S/W rasterizer 210 and/or the vertex transformer 212 may be implemented by instructions executed by any type of processor platform, such as the example processor platform 900 illustrated in FIG. 9 and described in greater detail below. Also, similar to the vertex cache(s) 115 included in the example system 100 of FIG. 1, the example graphics rendering system 200 may include one or more example vertex caches 215 to store the transformed vertex data generated by the pre-processing operation(s) implemented by vertex transformer 212 prior to rendering of the vertex data by the S/W rasterizer 210 into the pixels forming the output raster image. The vertex cache(s) 215 may be implemented by any type(s) and/or number of caches, memories, storage devices, etc.

In the illustrated example of FIG. 2, the graphics processor 205 is invoked by an example video driver 220, which may be implemented, for example, in hardware, software, or any combination thereof. Similar to the video driver 120 of FIG. 1, the example video driver 220 of FIG. 2 obtains an input vertex buffer, such as the example vertex buffer 305 of FIG. 3, for rendering from one or more applications, such as the example application 125, capable of generating image and/or video data to be displayed or otherwise output by an output device. The video driver 220 of the illustrated example also includes an example vertex buffer fetcher 230 to select entries of the vertex buffer for rendering using a relative index buffer, such as the example relative index buffer 315 illustrated in FIG. 3, in accordance with the examples disclosed herein. Operation of the vertex buffer fetcher 230 is similar to operation of the vertex buffer fetcher 130 described above. For example, like the vertex buffer fetcher 130, the example vertex buffer fetcher 230 of FIG. 2 iteratively accesses, in-order, successive entries of the relative index buffer for the input vertex buffer to determine a relative index corresponding to a next entry of the vertex buffer to be fetched and rendered. As noted above, for a given iteration in which a current vertex buffer entry is to be fetched and rendered, the respective relative index retrieved from the relative index buffer for that iteration specifies an offset between the current vertex buffer entry corresponding to the retrieved relative index and a prior matching vertex buffer entry, if one exists (e.g., within the offset addressable by the relative indices). Accordingly, like the vertex buffer fetcher 130, during a given iteration in which a current vertex buffer entry is to be fetched and rendered, the example vertex buffer fetcher 230 of FIG. 2 determines the vertex buffer index identifying the actual vertex buffer entry to be fetched and rendered to be a current iteration index (e.g., corresponding to the current relative index buffer entry and the corresponding current vertex buffer entry being processed) offset by the value of the relative index located at the current iteration index in the relative index buffer.

However, in the illustrated example of FIG. 2, the vertex buffer fetcher 230 invokes the graphics processor 205 to rasterize a current vertex buffer entry as follows. If the vertex cache 215 is not present (e.g., because prior transformed vertex data is not saved to be reused for processing future vertex buffer entries), or the relative index for the current iteration is zero (0), then the vertex buffer fetcher 230 fetches the vertex data from the vertex buffer entry indexed (or pointed to) by the determined vertex buffer index (which is equal to the current iteration index offset by the value of the relative index in the current relative index buffer entry) and provides the fetched vertex data to the vertex transformer 212 and the S/W rasterizer 210 for rendering. However, if the vertex cache 215 is present, and if the relative index for a current iteration is a nonzero value, then there may be cached, transformed vertex data already stored in the vertex cache 215 for the matching prior vertex buffer entry identified by the vertex buffer index. Accordingly, the vertex buffer fetcher 230 uses the vertex buffer index (which is equal to the current iteration index offset by the value of the relative index in the current relative index buffer entry) to access the vertex cache 215 and retrieve the cached vertex data obtained from prior processing of the prior vertex buffer entry matching the current vertex buffer entry by the vertex transformer 212. The vertex buffer fetcher 230 can then provide this cached vertex data to the S/W rasterizer 210 for further rendering. In this way, the vertex buffer fetcher 230 can avoid having the vertex transformer 212 waste resources to fetch and perform one or more intermediate operations on the vertex data in the current vertex buffer entry, which is a duplicate of the matching prior vertex buffer entry.

Accordingly, in some examples, the size (e.g., in terms of number of bits, such as 4 bits, 8 bits, 16 bits, etc.) of the relative indices stored in the relative index buffer may be tailored to correspond to the size of the vertex cache(s) 215 included in the system 200. For example, the size of the relative indices stored in the relative index buffer may be specified such that the maximum offset capable of being represented by a relative index is equal to, or otherwise is based on, the depth of the vertex cache(s) 215 (or, in other words, the number of vertex entries, e.g., 16, 256, 65536, etc., capable of being stored in the vertex cache(s) 215). Also, similar to the vertex buffer fetcher 130 of FIG. 1, in some examples, the vertex buffer fetcher 230 performs a redundancy checking procedure to generate the respective relative index buffer to be associated with an input vertex buffer when the vertex buffer is initially obtained by the video driver 220. After determining the relative index buffer for the vertex buffer, the vertex buffer fetcher 230 can further store the relative index buffer and its association with the vertex buffer for future rendering of this same vertex buffer (e.g., to avoid having to regenerate the relative index buffer in the future), as described above.

A block diagram of an example vertex buffer fetcher 300 that may be used to implement the vertex buffer fetcher 130 of FIG. 1 and/or the vertex buffer fetcher 230 of FIG. 2 is illustrated in FIG. 3. The vertex buffer fetcher 300 of the illustrated example accepts an example vertex buffer 305 having entries storing a sequence of vertex data to be rendered. The vertex buffer fetcher 300 includes an example redundancy checker 310 to determine an example relative index buffer 315 to be associated with the vertex buffer 305. For example, the redundancy checker 310 can generate the relative index buffer 315 for the vertex buffer 305 as follows. Assuming the relative indices stored in the relative index buffer 315 are n=$\log_2$ N bits in length, then the redundancy checker 310 reads entries of the vertex buffer 305 sequentially in-order and maintains a ring buffer of the last N entries read from the vertex buffer 305. For a current entry read from the vertex buffer 305, the redundancy checker 310 writes the current vertex buffer entry to the ring. The redundancy checker 310 also searches the ring backwards (or forwards with an offset of 1) and sets the relative index for the current vertex buffer entry to be the index of the first matching entry in the ring (e.g., modulo N). If there is no matching entry in the ring, then the redundancy checker 310 sets the relative index for the current vertex buffer entry to be equal to zero (e.g., if the relative index was not already initialized to be zero beforehand). Accordingly, a relative index having a size of n=$\log_2$ N can specify an offset from 0 to −(N−1). For example, if n=8, then the relative index can specify an offset from 0 to −255 entries in the vertex buffer 305.

In some examples, the length of the relative indices stored in the relative index buffer 315 is set based on the depth of the vertex cache(s) 115 and/or 215. For example, if a vertex cache has depth of N entries, setting the size of the relative indices included in the relative index buffer 315 to be n=$\log_2$ N enables the relative indices to index any entry stored in the cache.

In some examples, the redundancy checker 310 can update the relative index buffer 315 to reflect changes in one or more subranges of the vertex buffer 305 by, for example, resetting the respective relative indices in the relative index buffer 315 corresponding to the changed subrange(s) of the vertex buffer 305 to be equal to 0. The zeroed relative indices then cause those changed vertex buffer entries to be fetched from the vertex buffer 305.

The illustrated example vertex buffer fetcher 300 of FIG. 3 operates to cause entries of the vertex buffer 305 to be rendered in-order (e.g., sequentially) starting with a first entry in the buffer. Accordingly, the vertex buffer fetcher 300 includes an example walking counter 320 to increment a current iteration index tracking each successive iteration of selecting a next vertex buffer entry for processing. In other words, the current iteration index identifies the current vertex buffer entry to be rendered, as well as the current relative index buffer entry corresponding to this current vertex buffer entry. Accordingly, the current iteration index is also referred to herein as a current index selecting the current entry of the vertex buffer 305 to be rendered. However, the actual vertex buffer entry to be rendered during the current iteration may be different from the current vertex buffer entry selected by the current iteration index due to the relative index value specified for the current vertex buffer entry. The walking counter 320 can be implemented by any type of digital counter, counting logic, etc., capable of producing an output that counts from an initial value (e.g., 0 or 1, etc.) up to a total number of entries in the vertex buffer 305 (e.g., N−1 or N, where N is the total number of entries in the vertex buffer 305).

For example, the vertex buffer fetcher 300 includes an example relative index retriever 325 to retrieve a current entry of the relative index buffer 315 corresponding to the current iteration index maintained by the walking counter 320. The vertex buffer fetcher 300 further includes an example vertex buffer indexer 330 to determine a vertex buffer index based on the current iteration index maintained by the walking counter 320 offset by the relative index retrieved by the relative index retriever 325. For example, if the relative indices in the relative index buffer 315 specify negative offset values, then the vertex buffer indexer 330 can determine the vertex buffer index for the current iteration by adding the relative index retrieved by the relative index retriever 325 to the current iteration index maintained by the walking counter 320. However, if the relative indices in the relative index buffer 315 specify positive offset values, then the vertex buffer indexer 330 can determine the vertex buffer index for the current iteration by subtracting the relative index retrieved by the relative index retriever 325 from the current iteration index maintained by the walking counter 320. The vertex buffer index determined by the vertex buffer indexer 330 of the illustrated example specifies the actual vertex buffer entry to be rendered for the current iteration, which may be the same or different from the current vertex buffer entry specified by the current iteration index depending on the value of the relative index buffer entry corresponding to the current vertex buffer entry.

An example operation 400 of the relative index retriever 325 and the vertex buffer indexer 330 to further illustrate determination of a vertex buffer index from a current iteration index and a relative index is shown in FIG. 4. The example of FIG. 4 depicts an example implementation of the vertex buffer 305 having six (6) entries indexed from 0 to 5 and containing respective vertex data to be rendered. The example of FIG. 4 also depicts an example implementation of the relative index buffer 315 having six (6) entries containing the relative indices (denoted as R_IDX(i) in FIG. 4) corresponding to the respective vertex buffer entries (denoted as VERTEX_DATA(i) in FIG. 4) of the vertex buffer 305.

In the example operation 400 of FIG. 4, the walking counter 320 increments an example current iteration index 405 to select each successive entry of the vertex buffer 305 for rendering. At the first iteration, the current iteration index 405 equals 0 and the relative index retriever 325 retrieves the first entry, R_IDX(0), from the relative index buffer 315. In the illustrated example, the value of the retrieved relative index is R_IDX(0)=0. Accordingly, the vertex buffer indexer 330 determines the vertex buffer index to be equal to the value of the current iteration index 405 and, thus, the vertex buffer index (represented by the line 410) points to the first entry, VERTEX_DATA(0), of the vertex buffer 305. In other words, the value of 0 for the relative index R_IDX(0) represents an index miss for the first entry, VERTEX_DATA (0), of the vertex buffer 305, thereby indicating that this entry of the vertex buffer 305 is to be fetched for processing.

At the second iteration of the illustrated example, the current iteration index 405 is incremented by the walking counter 320 to be equal to 1 and the relative index retriever 325 retrieves the second entry, R_IDX(1), from the relative index buffer 315. In the illustrated example, the value of the retrieved relative index is R_IDX(1)=0. Accordingly, the vertex buffer indexer 330 determines the vertex buffer index to be equal to the value of the current iteration index 405 and, thus, the vertex buffer index (represented by the line 415) points to the second entry, VERTEX_DATA(1), of the vertex buffer 305. In other words, the value of 0 for the relative index R_IDX(1) represents another index miss for the second entry, VERTEX_DATA(1), of the vertex buffer 305, thereby indicating that this entry of the vertex buffer 305 is to be fetched for processing.

At the third iteration of the illustrated example, the current iteration index 405 is incremented by the walking counter 320 to be equal to 2 and the relative index retriever 325 retrieves the third entry, R_IDX(2), from the relative index buffer 315. In the illustrated example, the value of the retrieved relative index is R_IDX(2)=0. Accordingly, the vertex buffer indexer 330 determines the vertex buffer index to be equal to the value of the current iteration index 405 and, thus, the vertex buffer index (represented by the line 420) points to the third entry, VERTEX_DATA(2), of the vertex buffer 305. In other words, the value of 0 for the relative index R_IDX(2) represents another index miss for the third entry, VERTEX_DATA(2), of the vertex buffer 305, thereby indicating that this entry of the vertex buffer 305 is to be fetched for processing.

At the fourth iteration of the illustrated example, the current iteration index 405 is incremented by the walking counter 320 to be equal to 3 and the relative index retriever 325 retrieves the fourth entry, R_IDX(3), from the relative index buffer 315. In the illustrated example, the value of the retrieved relative index is R_IDX(3)=−1. Accordingly, the vertex buffer indexer 330 determines the vertex buffer index to be equal to the value of the current iteration index 405 offset by the value −1 and, thus, the vertex buffer index (represented by the line 425) points to the third entry, VERTEX_DATA(2), of the vertex buffer 305. In other words, the non-zero value of −1 for the relative index R_IDX(3) represents an index hit for the fourth entry, VERTEX_DATA(3), of the vertex buffer 305, and the cached vertex data corresponding to the third entry, VERTEX_DATA(2), can be used for rendering during the current iteration rather than fetching and processing the vertex data for the fourth entry, VERTEX_DATA(3).

At the fifth iteration of the illustrated example, the current iteration index 405 is incremented by the walking counter 320 to be equal to 4 and the relative index retriever 325 retrieves the fifth entry, R_IDX(4), from the relative index buffer 315. In the illustrated example, the value of the retrieved relative index is R_IDX(3)=−3. Accordingly, the vertex buffer indexer 330 determines the vertex buffer index to be equal to the value of the current iteration index 405 offset by the value −3 and, thus, the vertex buffer index (represented by the line 430) points to the second entry, VERTEX_DATA(1), of the vertex buffer 305. In other words, the non-zero value of −3 for the relative index R_IDX(4) represents an index hit for the fifth entry, VERTEX_DATA(4), of the vertex buffer 305, and the cached vertex data corresponding to the second entry, VERTEX_DATA(1), can be used for rendering during the current iteration rather than fetching and processing the vertex data for the fifth entry, VERTEX_DATA(4).

At the sixth iteration of the illustrated example, the current iteration index 405 is incremented by the walking counter 320 to be equal to 5 and the relative index retriever 325 retrieves the sixth entry, R_IDX(5), from the relative index buffer 315. In the illustrated example, the value of the retrieved relative index is R_IDX(5)=0. Accordingly, the vertex buffer indexer 330 determines the vertex buffer index to be equal to the value of the current iteration index 405 and, thus, the vertex buffer index (represented by the line 435) points to the sixth entry, VERTEX_DATA(5), of the vertex buffer 305. In other words, the value of 0 for the relative index R_IDX(5) represents an index miss for the sixth entry, VERTEX_DATA(5), of the vertex buffer 305, thereby indicating that this entry of the vertex buffer 305 is to be fetched for processing.

Returning to FIG. 3, the illustrated example vertex buffer fetcher 300 further includes an example graphics processor invoker 335 to invoke a graphics processor (e.g., such as the example GPU 110 of FIG. 1 and/or the example graphics processor 210 of FIG. 2) to process the entry of the vertex buffer 305 indexed by the vertex buffer index determined by the vertex buffer indexer 330. For example, the graphics processor invoker 335 can be configured to invoke the GPU 105 of FIG. 1 by passing, to the GPU 105, a starting index of the vertex buffer 305 and the vertex buffer index determined by the vertex buffer indexer 330. In some examples, the H/W rasterizer 110 then retrieves cached, transformed vertex data from the vertex cache(s) 115 or the vertex transformer 112 fetches and processes vertex data from the vertex buffer 305 depending on whether the vertex buffer index points to a prior entry or a current entry, respectively, of the vertex buffer 305.

Additionally or alternatively, the graphics processor invoker 335 can be configured to invoke the S/W graphics processor 205 by fetching vertex data from the entry of the vertex buffer 305 indexed by the vertex buffer index and providing the fetched vertex data to the S/W graphics processor 205 when, for example, the vertex cache 215 is not present or the vertex buffer index points to the current entry of the vertex buffer 305. However, if the vertex cache 215 is present, and the vertex buffer index points to the a prior entry of the vertex buffer 305, then the graphics processor invoker 335 can retrieve cached, transformed vertex data corresponding to the prior vertex buffer entry selected by the vertex buffer index and provide the cached vertex data to the S/W rasterizer 210 create the corresponding rasterized data.

While example manners of implementing the systems 100 and/or 200 have been illustrated in FIGS. 1-4, one or more of the elements, processes and/or devices illustrated in FIGS. 1-4 may be combined, divided, re-arranged, omitted, eliminated and/or implemented in any other way. Further, the example vertex buffer fetchers 130, 230 and 300, the example GPU 105, the example H/W rasterizer 110, the example vertex transformer 112, the example vertex cache 115, the example video driver 120, the example application 125, the example S/W rasterizer 210, the example vertex transformer 212, the example vertex cache 215, the example video driver 220, the example vertex buffer 305, the example redundancy checker 310, the example relative index buffer 315, the example walking counter 320, the example relative index retriever 325, the example vertex buffer indexer 330, the example graphics processor invoker 335 and/or the example systems 100 and/or 200 of FIGS. 1-4 may be implemented by hardware, software, firmware and/or any combination of hardware, software and/or firmware. Thus, for example, any of the example systems 100 and/or 200, the example vertex buffer fetchers 130, 230 and/or 300, the example GPU 105, the example H/W rasterizer 110, the example vertex transformer 112, the example vertex cache 115, the example video driver 120, the example application 125, the example S/W rasterizer 210, the example vertex transformer 212, the example vertex cache 215, the example video driver 220, the example vertex buffer 305, the example redundancy checker 310, the example relative index buffer 315, the example walking counter 320, the example relative index retriever 325, the example vertex buffer indexer 330 and/or the example graphics processor invoker 335 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example systems 100 and/or 200, the example vertex buffer fetchers 130, 230 and/or 300, the example GPU 105, the example H/W rasterizer 110, the example vertex transformer 112, the example vertex cache 115, the example video driver 120, the example application 125, the example S/W rasterizer 210, the example vertex transformer 212, the example vertex cache 215, the example video driver 220, the example vertex buffer 305, the example redundancy checker 310, the example relative index buffer 315, the example walking counter 320, the example relative index retriever 325, the example vertex buffer indexer 330 and/or the example graphics processor invoker 335 is/are hereby expressly defined to include a tangible computer readable storage device or storage disk such as a memory, a digital versatile disk (DVD), a compact disk (CD), a Blu-ray disk, etc. storing the software and/or firmware. Further still, the example vertex buffer fetchers 130, 230 and/or 300, the example vertex buffer fetchers 130, 230 and/or 300, the example GPU 105, the example H/W rasterizer 110, the example vertex transformer 112, the example vertex cache 115, the example video driver 120, the example application 125, the example S/W rasterizer 210, the example vertex transformer 212, the example vertex cache 215, the example video driver 220, the example vertex buffer 305, the example redundancy checker 310, the example relative index buffer 315, the example walking counter 320, the example relative index retriever 325, the example vertex buffer indexer 330 and/or the example graphics processor invoker 335 of FIGS. 1-4 may include one or more elements, processes and/or devices in addition to, or instead of, those illustrated in FIGS. 1-4, and/or may include more than one of any or all of the illustrated elements, processes and devices.

Flowcharts representative of example machine readable instructions for implementing the example systems 100 and/or 200, the example vertex buffer fetchers 130, 230 and/or 300, the example GPU 105, the example H/W rasterizer 110, the example vertex transformer 112, the example vertex cache 115, the example video driver 120, the example application 125, the example S/W rasterizer 210, the example vertex transformer 212, the example vertex cache 215, the example video driver 220, the example vertex buffer 305, the example redundancy checker 310, the example relative index buffer 315, the example walking counter 320, the example relative index retriever 325, the example vertex buffer indexer 330 and/or the example graphics processor invoker 335 are shown in FIGS. 5-8. In these examples, the machine readable instructions comprise one or more programs for execution by a processor, such as the processor 912 shown in the example processor platform 900 discussed below in connection with FIG. 9. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 912, but the entire program or programs and/or portions thereof could alternatively be executed by a device other than the processor 912 and/or embodied in firmware or dedicated hardware (e.g., implemented by an ASIC, a PLD, an FPLD, discrete logic, etc.). Also, one or more of the machine readable instructions represented by the flowcharts of FIGS. 5-8 may be implemented manually. Further, although the example program(s) is(are) described with reference to the flowcharts illustrated in FIGS. 5-8, many other methods of implementing the example systems 100 and/or 200, the example vertex buffer fetchers 130, 230 and/or 300, the example GPU 105, the example H/W rasterizer 110, the example vertex transformer 112, the example vertex cache 115, the example video driver 120, the example application 125, the example S/W rasterizer 210, the example vertex transformer 212, the example vertex cache 215, the example video driver 220, the example vertex buffer 305, the example redundancy checker 310, the example relative index buffer 315, the example walking counter 320, the example relative index retriever 325, the example vertex buffer indexer 330 and/or the example graphics processor invoker 335 may alternatively be used. For example, with reference to the flowcharts illustrated in FIGS. 5-8, the order of execution of the blocks may be changed, and/or some of the blocks described may be changed, eliminated, combined and/or subdivided into multiple blocks.

As mentioned above, the example processes of FIGS. 5-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-8 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

Figure 5:
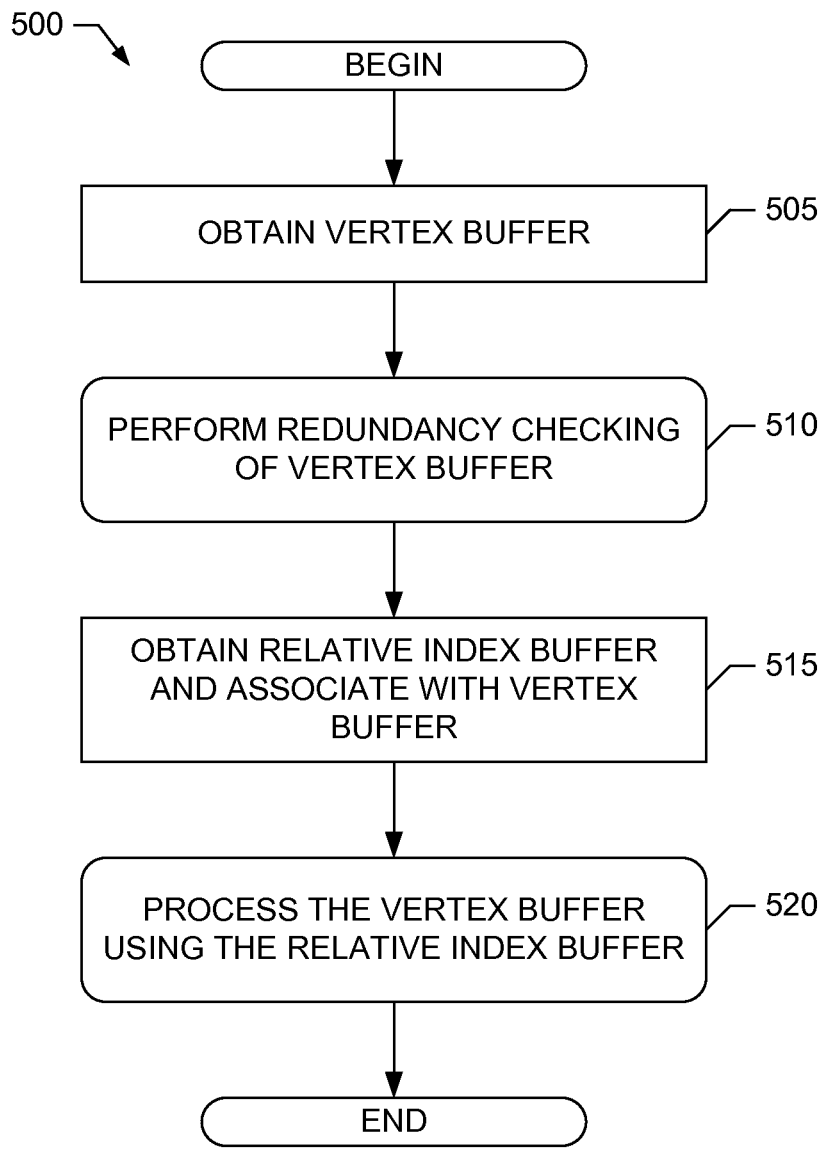
FIG. 5 is a flowchart representative of example machine readable instructions that may be executed to implement the example graphics rendering systems of FIGS. 1 and/or 2, and/or the example vertex buffer fetcher of FIG. 3.

An example program 500 that may be executed to implement the example vertex buffer fetcher 300 of FIG. 3 is represented by the flowchart shown in FIG. 5. For convenience, execution of the example program 500 is described from the perspective of the vertex buffer fetcher 300 being used to implement the vertex buffer fetchers 130 and/or 230 of FIGS. 1-2. With reference to the preceding figures and associated written descriptions, the example program 500 of FIG. 5 begins execution at block 505 at which the vertex buffer fetcher 300 obtains the input vertex buffer 305 for rasterization from, for example, the application 125, as described above. At block 510, the redundancy checker 310 of the vertex buffer fetcher 300 performs a redundancy checking procedure to determine the relative index buffer 315 for the input vertex buffer 305 obtained at block 505. Example redundancy checking procedures that may be used to implement the processing at block 510 are described above and in the context of FIG. 6 below.

At block 515, the redundancy checker 310 obtains the relative index buffer 315 for the input vertex buffer 305 and associates the relative index buffer 315 with the vertex buffer 305 for current and future rasterization of the vertex buffer 305, as described above. At block 520, the vertex buffer fetcher 300 uses the relative index buffer 315 associated with the input vertex buffer 305 to perform graphics processing of the vertex buffer 305 (e.g., using the GPU 105 and/or the S/W graphics processor 205) to determine rasterizer outputs associated with the entries of the vertex buffer 305. Example graphics processing procedures based on relative index buffers that may be used to implement the processing at block 520 are described above and in the context of FIGS. 7-8 below.

Figure 6:
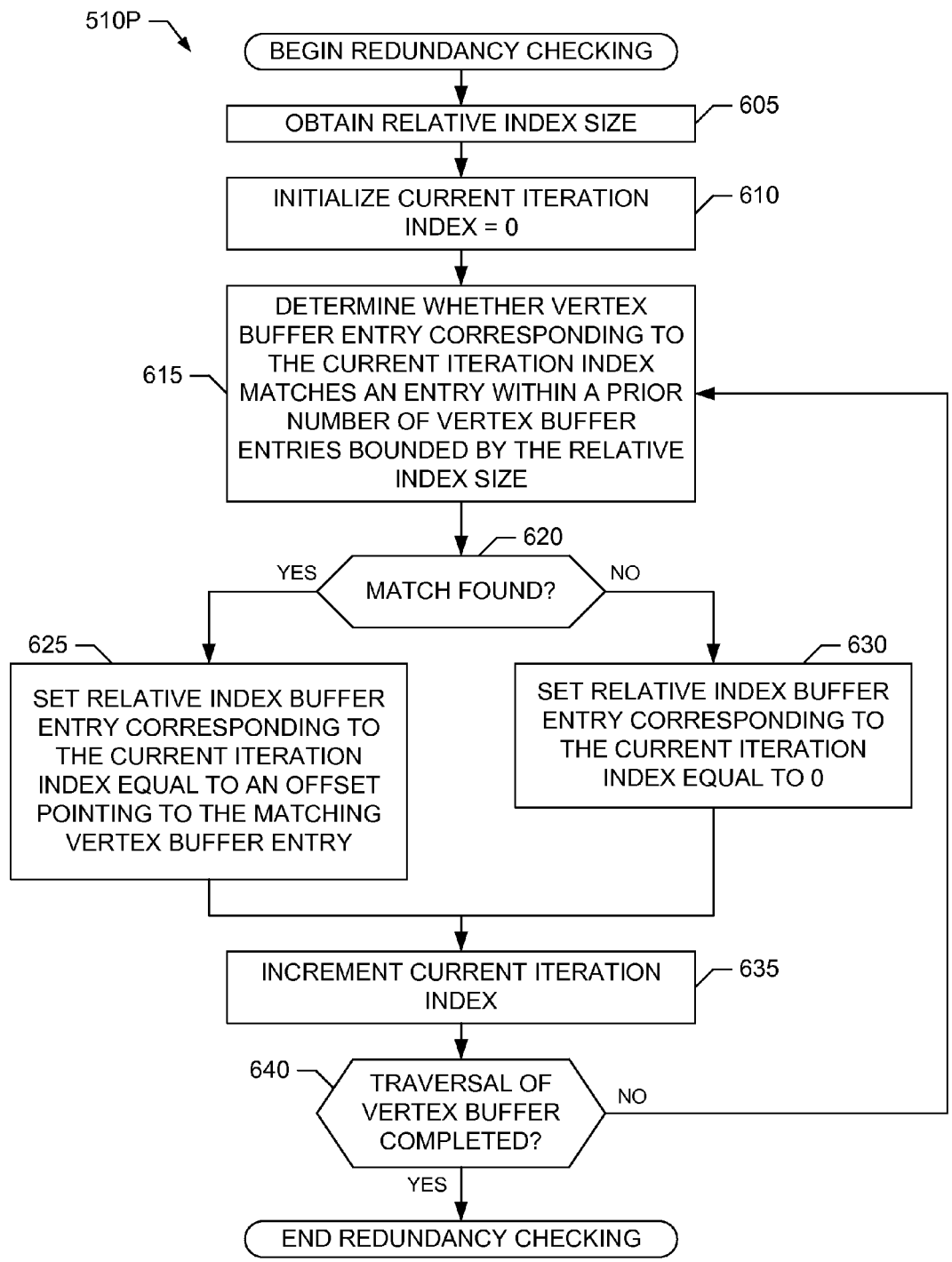
FIG. 6 is a flowchart representative of example machine readable instructions that may be used to implement the example machine readable instructions of FIG. 5 and/or that may be executed to implement vertex buffer redundancy checking in the example graphics rendering systems of FIGS. 1 and/or 2, and/or the example vertex buffer fetcher of FIG. 3.

An example program 510P that may be used to implement the processing at block 510 of FIG. 5 is represented by the flowchart shown in FIG. 6. With reference to the preceding figures and associated written descriptions, the example program 510P of FIG. 6 begins execution at block 605 at which the redundancy checker 310 of the vertex buffer fetcher 300 obtains the size (e.g., 4 bits, 8 bits, 16 bits, etc.) of the relative indices stored in the relative index buffer 315. For example, the relative index size may correspond to the depth of the vertex cache 115 and/or 215 based on, for example, the relationship $n=\log_2 N$, where n is the size of the relative indices in bits, and N is the number of entries in the cache, as described in greater detail above. At block 610, the redundancy checker 310 initializes a current iteration index equal to 0. In some examples, the redundancy checker 310 can use the walking counter 320 of the vertex buffer fetcher 300 to initialize and increment the value of the current iteration index in the example program 510P.

At block 615, the redundancy checker 310 determines whether a current entry of the vertex buffer 305, which corresponds to (e.g., is indexed by) the value of the current iteration index, matches a prior entry of the vertex buffer 305 within a prior number of vertex buffer entries bounded by the relative index size obtained at block 605. For example, the redundancy checker 310 can use a ring buffer, as described above, to facilitate comparison of current and prior entries of the vertex buffer 305. In such examples, the size of the ring, N, which bounds the number of prior vertex buffer entries to be compared with the current vertex buffer entry, may be set based on the relative index size, n, to be $N=2^n$.

If a match between the current vertex buffer entry and a prior vertex buffer entry is found (block 620), then at block 625 the redundancy checker 310 sets the relative index buffer entry corresponding to the current vertex buffer entry equal to an offset between the current and matching prior vertex buffer entries, as described above. However, if a match between the current vertex buffer entry and a prior vertex buffer entry is not found (block 620), then at block 630 the redundancy checker 310 sets the relative index buffer entry corresponding to the current vertex buffer entry equal to 0, as described above. At block 635, the redundancy checker 310 increments the current iteration index. At block 640, the redundancy checker 310 determines whether redundancy checking of the vertex buffer 305 is complete (e.g., by determining whether the value of the current iteration index exceeds the size of the vertex buffer 305). If redundancy checking of the vertex buffer 305 is not complete (block 640), then processing returns to block 615 and the blocks subsequent thereto at which redundancy checking is performed for the next entry in the vertex buffer 305. Otherwise, execution of the example program 510P ends.

Figure 7:
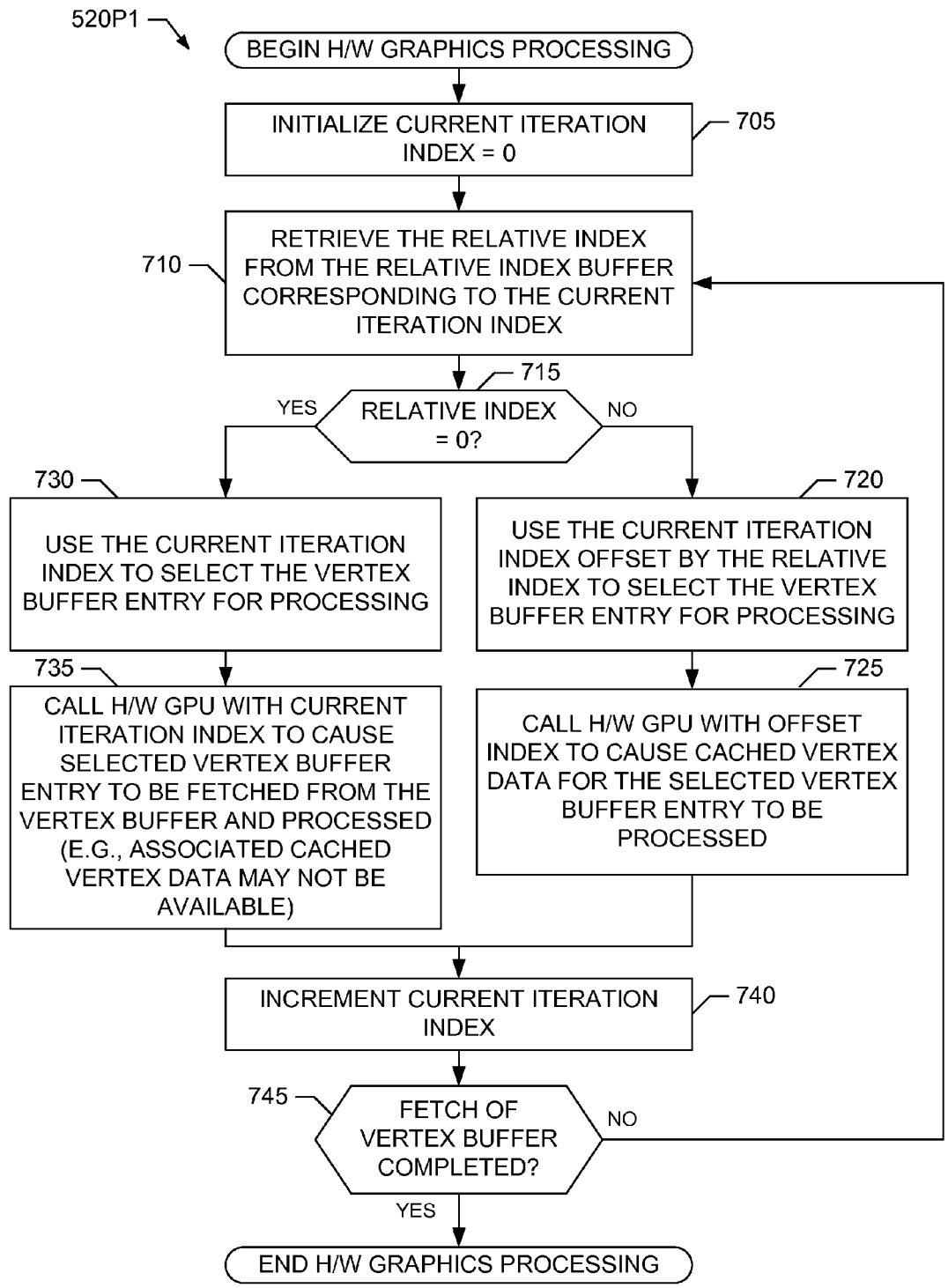
FIG. 7 is a flowchart representative of example machine readable instructions that may be used to implement the example machine readable instructions of FIG. 5 and/or that may be executed to implement hardware-based processing of a vertex buffer using a relative index buffer in the example graphics rendering systems of FIGS. 1 and/or 2, and/or the example vertex buffer fetcher of FIG. 3.

A first example program 520P1 that may be used to implement the processing at block 520 of FIG. 5 is represented by the flowchart shown in FIG. 7. With reference to the preceding figures and associated written descriptions, the example program 520P1 of FIG. 7 begins execution at block 705 at which the walking counter 320 of the vertex buffer fetcher 300 initializes the value of the current iteration index equal to 0. At block 710, the relative index retriever 325 of the vertex buffer fetcher 300 retrieves the current relative index, which corresponds to the value of the current iteration index, from the relative index buffer 315, as described above. If the value of the current relative index is nonzero (block 715), then at block 720 the vertex buffer indexer 330 of the vertex buffer fetcher 300 determines the vertex buffer index for selecting the entry of the vertex buffer 305 for rendering to be the value of the current iteration index offset by the current relative index, as described above. At block 725, the graphics processor invoker 335 of the vertex buffer fetcher 300 calls, for example, the GPU 105 using the offset vertex buffer index determined at block 720, which causes the H/W rasterizer 110 included in the GPU 105 to fetch and process cached, transformed vertex data associated with the prior vertex buffer entry pointed to by the offset vertex buffer index, as described above.

However, if the value of the current relative index is zero (block 715), then at block 730 the vertex buffer indexer 330 determines the vertex buffer index for selecting the entry of the vertex buffer 305 for rendering to be the value of the current iteration index, as described above. At block 735, the graphics processor invoker 335 of the vertex buffer fetcher 300 calls, for example, the GPU 105 using the non-offset vertex buffer index determined at block 730, which causes the vertex transformer 112 included in the GPU 105 to fetch and process vertex data from the current vertex buffer entry (e.g., because cached vertex data for the current vertex buffer entry may not be available), which is then processed by the H/W rasterizer 110, as described above. At block 740, the walking counter 320 increments the current iteration index. At block 745, relative index retriever 325 determines whether fetching of the vertex buffer 305 for rendering is complete (e.g., by determining whether the value of the current iteration index exceeds the size of the relative index buffer 315 and/or the vertex buffer 305). If fetching of the vertex buffer 305 is not complete (block 745), then processing returns to block 710 and the blocks subsequent thereto at which graphics processing based on the next entry of the relative index buffer 315 is performed. Otherwise, execution of the example program 520P1 ends.

In some examples, the processing at blocks 715, 730 and 735 may be omitted if, for example, the GPU 105 automatically detects vertex cache hits and misses. In such examples, the vertex buffer indexer 330 may compute the vertex buffer index to be equal to the current iteration index offset by the current relative index regardless of whether the current relative index is a zero or non-zero value.

Figure 8:
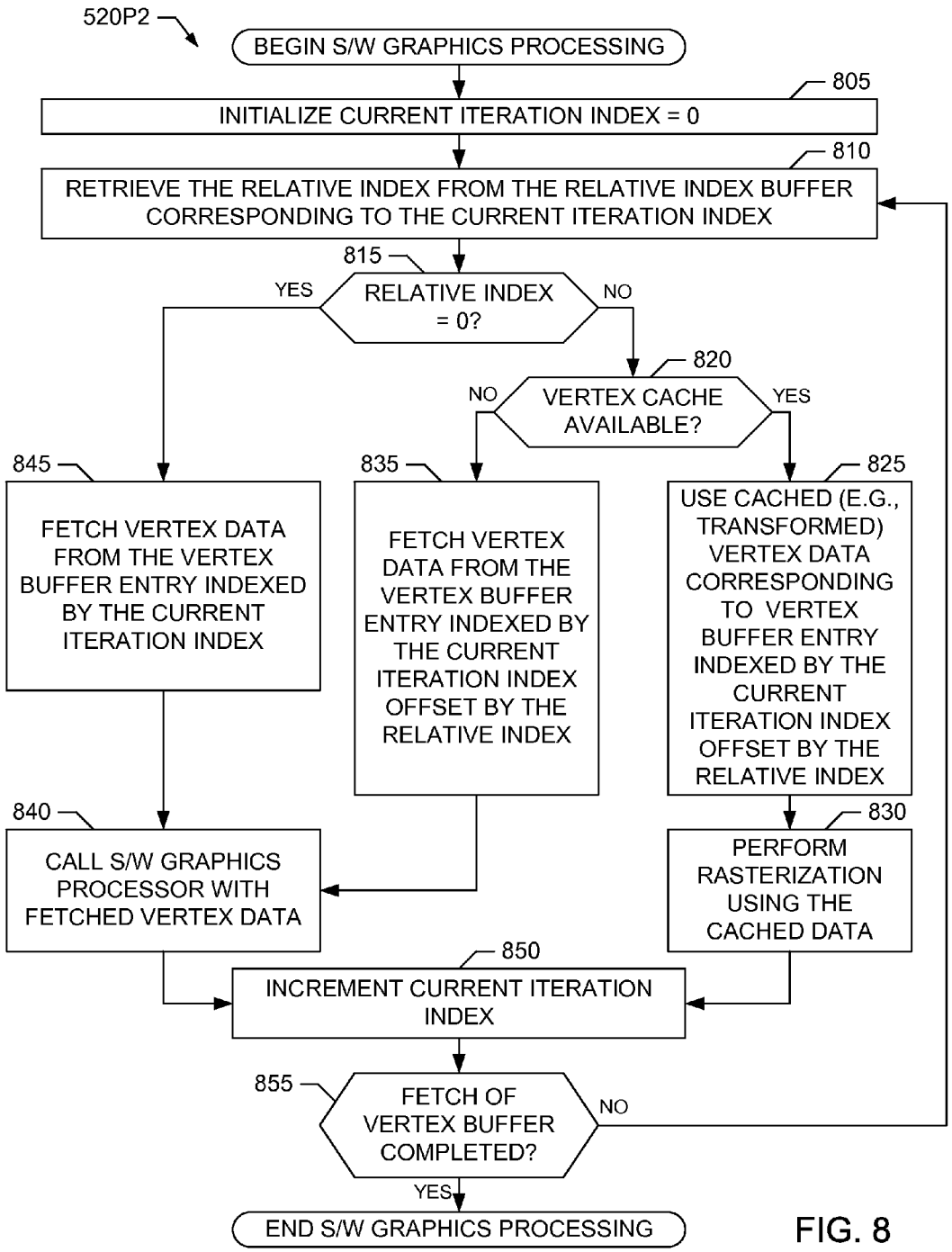
FIG. 8 is a flowchart representative of example machine readable instructions that may be used to implement the example machine readable instructions of FIG. 5 and/or that may be executed to implement software-based processing of a vertex buffer using a relative index buffer in the example graphics rendering systems of FIGS. 1 and/or 2, and/or the example vertex buffer fetcher of FIG. 3.

A second example program 520P2 that may be used to implement the processing at block 520 of FIG. 5 is represented by the flowchart shown in FIG. 8. With reference to the preceding figures and associated written descriptions, the example program 520P2 of FIG. 8 begins execution at block 805 at which the walking counter 320 of the vertex buffer fetcher 300 initializes the value of the current iteration index equal to 0. At block 810, the relative index retriever 325 of the vertex buffer fetcher 300 retrieves the current relative index, which corresponds to the value of the current iteration index, from the relative index buffer 315, as described above. If the value of the current relative index is nonzero (block 815), then at block 820 the graphics processor invoker 335 of the vertex buffer fetcher 300 determines whether a vertex cache, such as the vertex cache 215, is available. If a vertex cache is available (block 820), then at block 825 the vertex buffer indexer 330 of the vertex buffer fetcher 300 determines the vertex buffer index for selecting the entry of the vertex buffer 305 for rendering to be the value of the current iteration index offset by the current relative index, as described above. At block 825, the graphics processor invoker 335 also uses the offset vertex buffer index determined by the vertex buffer indexer 330 to access cached, transformed vertex data (e.g., from the vertex cache 215) corresponding to the prior vertex buffer entry indexed by the offset vertex buffer index, as described above. At block 830, the graphics processor invoker 335 invokes, for example, the S/W rasterizer 210 to perform rendering using the cached vertex data retrieved at block 825, as described above.

However, if a vertex cache is not available (block 820), then at block 835 the vertex buffer indexer 330 of the vertex buffer fetcher 300 determines the vertex buffer index for selecting the entry of the vertex buffer 305 for rendering to be the value of the current iteration index offset by the current relative index, as described above. At block 825, the graphics processor invoker 335 also uses the offset vertex buffer index determined by the vertex buffer indexer 330 to fetch vertex data from the prior entry of the vertex buffer 305 that is indexed by the offset vertex buffer index, as described above. At block 840, the graphics processor invoker 335 invokes, for example, the software graphics processor 205 (e.g., including the vertex transformer 212 and the S/W rasterizer 210) to perform rendering using the fetched vertex data retrieved at block 835, as described above.

However, if the value of the current relative index is zero (block 815), then at block 845 the vertex buffer indexer 330 determines the vertex buffer index for selecting the entry of the vertex buffer 305 for rendering to be the value of the current iteration index, as described above. At block 840, the graphics processor invoker 335 invokes, for example, the software graphics processor 205 (e.g., including the vertex transformer 212 and the S/W rasterizer 210) to perform rendering using the fetched vertex data retrieved at block 845, as described above. At block 850, the walking counter 320 increments the current iteration index. At block 855, the relative index retriever 325 determines whether fetching of the vertex buffer 305 for rendering is complete (e.g., by determining whether the value of the current iteration index exceeds the size of the relative index buffer 315 and/or the vertex buffer 305). If fetching of the vertex buffer 305 is not complete (block 855), then processing returns to block 810 and the blocks subsequent thereto at which rasterization based on the next entry of the relative index buffer 315 is performed. Otherwise, execution of the example program 520P2 ends.

Tables 1 and 2 illustrate respective pseudocode for implementing a prior rasterization technique and a disclosed example rasterization technique. In particular, Table 1 illustrates a prior rasterization technique based on absolute indexing of a vertex buffer. At line 1 of Table 1, a current iteration index (currentIndex) is initialized to 0. At line 2 of Table 1, the pseudocode iterates through an absolute index buffer (AbsIndexBuffer). For a given iteration, at line 3 of Table 1, the vertex buffer index (vbIndex) for vertex buffer entry to be rendered is set to the value of the absolute index buffer (AbsIndexBuffer) entry indexed by the current iteration index (currentIndex). At line 4 of Table 1, the vertex data (vertex) to be rendered for the current iteration is retrieved from the vertex buffer (VertexBuffer) using the vertex buffer index (vbIndex), which was set to be equal to the absolute index value retrieved from the absolute index buffer (AbsIndexBuffer). At line 5 of Table 1, processing of the vertex data (vertex) is performed by calling a RunVertexTransformer function. At line 6 of Table 1, the current iteration index (currentIndex) is incremented by 1.

TABLE 1

```
1: currentIndex <- 0
2: while currentIndex < length(AbsIndexBuffer):
3:     vbIndex <- AbsIndexBuffer(currentIndex)
4:     vertex <- GetVertex(vbIndex, VertexBuffer)
5:     RunVertexTransformer (vertex)
6:     currentIndex <- currentIndex + 1
```

Table 2 illustrates example rasterization technique based on relative indexing of the vertex buffer in accordance with the examples disclosed herein. At line 11 of Table 2, a current iteration index (currentIndex) is initialized to 0. At line 12 of Table 2, the pseudocode iterates through a relative index buffer (RelativeIndexBuffer). For a given iteration, at line 13 of Table 2, the current relative index (relIndex) corresponding to the current vertex buffer entry to be rendered is retrieved from the relative index buffer (RelativeIndexBuffer). At line 14 of Table 2, the vertex buffer index (vbIndex) for vertex buffer entry to be rendered is set to the value of the current iteration index (currentIndex) offset by the current relative index (relIndex). At line 15 of Table 2, the vertex data (vertex) to be rendered for the current iteration is retrieved from the vertex buffer (VertexBuffer) using the vertex buffer index (vbIndex), which was set to be equal to the current iteration index (currentIndex) offset by the current relative index (relIndex). At line 16 of Table 2, processing of the vertex data (vertex) is performed by calling a RunVertexTransformer function. At line 7 of Table 2, the current iteration index (currentIndex) is incremented by 1.

TABLE 2

```
11: currentIndex <- 0
12: while currentIndex <length(RelativeIndexBuffer):
13:     relIndex <- RelativeIndexBuffer(currentIndex)
14:     vbIndex <- currentIndex - relIndex
15:     vertex <- GetVertex(vbIndex, VertexBuffer)
16:     RunVertexTransformer (vertex)
17:     currentIndex <- currentIndex + 1
```

Figure 9:
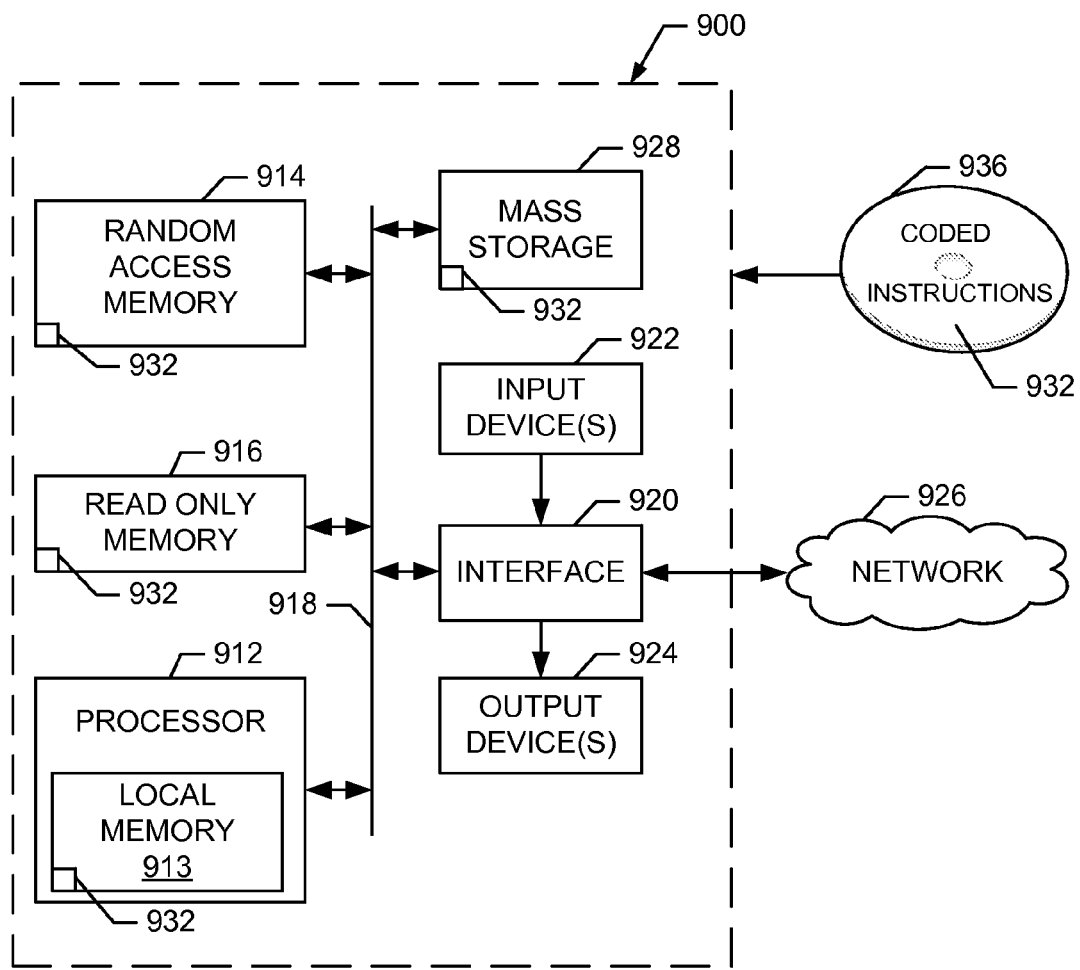
FIG. 9 is a block diagram of an example processor platform that may execute the example machine readable instructions of FIGS. 5-7 and/or 8 to implement the example graphics rendering systems of FIGS. 1 and/or 2, and/or the example vertex buffer fetcher of FIG. 3.

FIG. 9 is a block diagram of an example processor platform 900 capable of executing the instructions of FIGS. 5-8 to implement the example systems 100 and/or 200, the example vertex buffer fetchers 130, 230 and/or 300, the example GPU 105, the example H/W rasterizer 110, the example vertex transformer 112, the example vertex cache 115, the example video driver 120, the example application 125, the example S/W rasterizer 210, the example vertex transformer 212, the example vertex cache 215, the example video driver 220, the example vertex buffer 305, the example redundancy checker 310, the example relative index buffer 315, the example walking counter 320, the example relative index retriever 325, the example vertex buffer indexer 330 and/or the example graphics processor invoker 335 of FIGS. 1-4. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a digital camera, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache) (e.g., a cache). The processor 912 of the illustrated example is in communication with a main memory including a volatile memory 914 and a non-volatile memory 916 via a link 918. The link 918 may be implemented by a bus, one or more point-to-point connections, etc., or a combination thereof. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 900, can allow the user to control the computer system and provide data to the computer using physical gestures, such as, but not limited to, hand or body movements, facial expressions, and face recognition.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID (redundant array of independent disks) systems, and digital versatile disk (DVD) drives.

Coded instructions 932 corresponding to the instructions of FIGS. 5-8 may be stored in the mass storage device 928, in the volatile memory 914, in the non-volatile memory 916, in the local memory 913 and/or on a removable tangible computer readable storage medium, such as a CD or DVD 936.

The following further examples include subject matter such as a method, means for performing acts of the method, at least one machine-readable medium including instructions that, when performed by a machine cause the machine to performs acts of the method, an apparatus and/or system for graphics processing of a vertex buffer using a relative index buffer according to embodiments and examples disclosed herein.

Example 1 is a method to process a vertex buffer, the method including accessing a first relative index stored in a relative index buffer, the first relative index specifying an offset from a current index selecting a first entry of the vertex buffer. The method of example 1 also includes, in response to the first relative index being a nonzero value, processing data associated with a second entry of the vertex buffer to determine a rasterizer output associated with the first entry of the vertex buffer, the second entry of the vertex buffer being selected using the current index offset by the first relative index.

Example 2 may include the subject matter of example 1, and may further include, in response to the first relative index being zero, fetching and processing the first entry of the vertex buffer to determine the rasterizer output associated with the first entry of the vertex buffer.

Example 3 may include the subject matter of examples 1 and/or 2, wherein the first relative index is associated with the first entry of the vertex buffer, and the first relative index is selected from the relative index buffer using the current index.

Example 4 may include the subject matter of one or more of examples 1 to 3, wherein the relative index buffer stores relative indexes associated with respective entries of the vertex buffer, the relative index buffer is accessed iteratively using the current index, and the current index is incremented at each iteration of accessing the relative index buffer.

Example 5 may include the subject matter of one or more of examples 1 to 4, wherein the data associated with the second entry of the vertex buffer is cached data associated with the second entry of the vertex buffer, and processing the data associated with the second entry of the vertex buffer includes (1) calculating an index value corresponding to the current index offset by the first relative index, and (2) calling a rasterizer using the index value to cause the rasterizer to access the cached data associated with the second entry of the vertex buffer.

Example 6 may include the subject matter of one or more of examples 1 to 4, wherein processing the data associated with the second entry of the vertex buffer includes (1) when a vertex cache is present, accessing first data from the vertex cache, the first data obtained from previous rasterization processing associated with the second entry of the vertex buffer, and (2) when the vertex cache is not present, fetching second data included in the second entry of the vertex buffer and performing rasterization using the fetched second data.

Example 7 may include the subject matter of examples 1 to 6, and may further include (1) comparing entries of the vertex buffer with past entries of the vertex buffer within a prior number of vertex buffer entries, the prior number of entries being based on a relative index size, and (2) in response to determining that the first entry of the vertex buffer matches the second entry of the vertex buffer, setting the first relative index equal to an offset between the first entry of the vertex buffer and the second entry of the vertex buffer.

Example 8 is a computer readable storage medium including computer readable instructions which, when executed, may cause a computer to perform the method defined in any one or more of claims 1 to 7.

Example 9 is a tangible machine readable storage medium including machine readable instructions which, when executed, cause a machine to at least access a first relative index stored in a relative index buffer, the first relative index specifying an offset from a current index selecting a first entry of a vertex buffer. The instructions of example 9, when executed, also cause the machine to at least, in response to the first relative index being a nonzero value, process data associated with a second entry of the vertex buffer to determine a rasterizer output associated with the first entry of the vertex buffer, the second entry of the vertex buffer being selected using the current index offset by the first relative index.

Example 10 may include the subject matter of example 9, wherein the machine readable instructions, when executed, may further cause the machine to, in response to the first relative index being zero, fetch and process the first entry of the vertex buffer to determine the rasterizer output associated with the first entry of the vertex buffer.

Example 11 may include the subject matter of examples 9 and/or 10, wherein the first relative index is associated with the first entry of the vertex buffer, and the first relative index is selected from the relative index buffer using the current index.

Example 12 may include the subject matter of one or more of examples 9 to 11, wherein the relative index buffer stores relative indexes associated with respective entries of the vertex buffer, the relative index buffer is accessed iteratively using the current index, and the current index is incremented at each iteration of accessing the relative index buffer.

Example 13 may include the subject matter of one or more of examples 9 to 12, wherein the data associated with the second entry of the vertex buffer is cached data associated with the second entry of the vertex buffer, and the machine readable instructions, when executed, may further cause the machine to (1) calculate an index value corresponding to the current index offset by the first relative index, and (2) call a rasterizer using the index value to cause the rasterizer to access the cached data associated with the second entry of the vertex buffer.

Example 14 may include the subject matter of one or more of examples 9 to 12, wherein the machine readable instructions, when executed, further cause the machine to (1) when a vertex cache is present, access first data from the vertex cache, the first data obtained from previous rasterization processing associated with the second entry of the vertex buffer, and (2) when the vertex cache is not present, fetch second data included in the second entry of the vertex buffer and perform rasterization using the fetched second data.

Example 15 may include the subject matter of one or more of examples 9 to 14, wherein the machine readable instructions, when executed, may further cause the machine to (1) compare entries of the vertex buffer with past entries of the vertex buffer within a prior number of vertex buffer entries, the prior number of entries being based on a relative index size, and (2) in response to the first entry of the vertex buffer being determined to match the second entry of the vertex buffer, set the first relative index equal to an offset between the first entry of the vertex buffer and the second entry of the vertex buffer.

Example 16 is an apparatus to rasterize a vertex buffer using a relative index buffer, the apparatus including an index retriever to access a first relative index stored in the relative index buffer, the first relative index specifying an offset from a current index selecting a first entry of the vertex buffer. The apparatus of example 16 also includes an invoker to cause a rasterizer to process data associated with a second entry of the vertex buffer to determine a rasterizer output associated with the first entry of the vertex buffer in response to the first relative index being a nonzero value, the second entry of the vertex buffer being selected using the current index offset by the first relative index.

Example 17 may include the subject matter of example 16, wherein, in response to the first relative index being zero, the invoker is to cause the rasterizer to process data associated with the first entry of the vertex buffer to determine the rasterizer output associated with the first entry of the vertex buffer.

Example 18 may include the subject matter of examples 16 and/or 17, wherein the first relative index is associated with the first entry of the vertex buffer, and the first relative index is selected from the relative index buffer using the current index.

Example 19 may include the subject matter of one or more of examples 16 to 18, wherein the relative index buffer stores relative indexes associated with respective entries of the vertex buffer, the index retriever is to access the relative index buffer iteratively using the current index, and may further include a counter to increment the current index at each iteration of accessing the relative index buffer.

Example 20 may include the subject matter of one or more of examples 16 to 19, wherein the data associated with the second entry of the vertex buffer is cached data associated with the second entry of the vertex buffer, the apparatus may further include a buffer indexer to calculate an index value corresponding to the current index offset by the first relative index, and the invoker to call the rasterizer using the index value to cause the rasterizer to access the cached data associated with the second entry of the vertex buffer.

Example 21 may include the subject matter of one or more of examples 16 to 19, wherein the invoker is further to (1) when a vertex cache is present, access first data from the vertex cache, the first data obtained from previous rasterization processing of the second entry of the vertex buffer, and (2) when the vertex cache is not present, fetch second data included in the second entry of the vertex buffer and cause the rasterizer to perform rasterization using the fetched second data.

Example 22 may include the subject matter of one or more of examples 16 to 21, and may further include a redundancy checker to (1) compare entries of the vertex buffer with past entries of the vertex buffer within a prior number of vertex buffer entries, the prior number of entries being based on a relative index size, and (2) in response to the first entry of the vertex buffer being determined to match the second entry of the vertex buffer, set the first relative index equal to an offset between the first entry of the vertex buffer and the second entry of the vertex buffer.

Example 23 is an apparatus to rasterize a vertex buffer using a relative index buffer, the apparatus including means for accessing a first relative index stored in a relative index buffer, the first relative index specifying an offset from a current index selecting a first entry of the vertex buffer. The apparatus of example 33 also includes means for processing data associated with a second entry of the vertex buffer, in response to the first relative index being a nonzero value, to determine a rasterizer output associated with the first entry of the vertex buffer, the second entry of the vertex buffer being selected using the current index offset by the first relative index.

Example 24 may include the subject matter of example 23, and may further include means for fetching and processing the first entry of the vertex buffer, in response to the first relative index being zero, to determine the rasterizer output associated with the first entry of the vertex buffer.

Example 25 may include the subject matter of examples 23 and/or 24, wherein the first relative index is associated with the first entry of the vertex buffer, and the first relative index is selected from the relative index buffer using the current index.

Example 26 may include the subject matter of one or more of examples 23 to 25, wherein the relative index buffer stores relative indexes associated with respective entries of the vertex buffer, the relative index buffer is accessed iteratively using the current index, and the current index is incremented at each iteration of accessing the relative index buffer.

Example 27 may include the subject matter of one or more of examples 23 to 26, wherein the data associated with the second entry of the vertex buffer is cached data associated with the second entry of the vertex buffer, and the means for processing the data associated with the second entry of the vertex buffer includes (1) means for calculating an index value corresponding to the current index offset by the first relative index, and (2) means for calling a rasterizer using the index value to cause the rasterizer to access the cached data associated with the second entry of the vertex buffer.

Example 28 may include the subject matter of one or more of examples 23 to 26, wherein processing the data associated with the second entry of the vertex buffer includes (1) means for accessing first data from a vertex cache when the vertex cache is present, the first data obtained from previous rasterization processing associated with the second entry of the vertex buffer, and (2) means for fetching second data included in the second entry of the vertex buffer and performing rasterization using the fetched second data when the vertex cache is not present.

Example 29 may include the subject matter of one or more of examples 23 to 28, and may further include (1) means for comparing entries of the vertex buffer with past entries of the vertex buffer within a prior number of vertex buffer entries, the prior number of entries being based on a relative index size, and (2) means for setting the first relative index equal to an offset between the first entry of the vertex buffer and the second entry of the vertex buffer in response to determining that the first entry of the vertex buffer matches the second entry of the vertex buffer.

Example 30 is an apparatus (300) to rasterize a vertex buffer (305) using a relative index buffer (315), the apparatus (300) including an index retriever (325) to access a first relative index stored in the relative index buffer (315), the first relative index specifying an offset from a current index selecting a first entry of the vertex buffer (305). The apparatus (300) of example 43 also includes an invoker (335) to cause a rasterizer (110, 210) to process data associated with a second entry of the vertex buffer (305) to determine a rasterizer output associated with the first entry of the vertex buffer (305) in response to the first relative index being a nonzero value, the second entry of the vertex buffer (305) being selected using the current index offset by the first relative index.

Example 31 may include the subject matter of example 30, wherein, in response to the first relative index being zero, the invoker (335) is to cause the rasterizer (110, 210) to process data associated with the first entry of the vertex buffer (305) to determine the rasterizer output associated with the first entry of the vertex buffer (305).

Example 32 may include the subject matter of examples 30 and/or 31, wherein the first relative index is associated with the first entry of the vertex buffer (305), and the first relative index is selected from the relative index buffer (315) using the current index.

Example 33 may include the subject matter of example 32, wherein the relative index buffer (315) stores relative indexes associated with respective entries of the vertex buffer (305), the index retriever (325) is to access the relative index buffer (315) iteratively using the current index, and further including a counter (320) to increment the current index at each iteration of accessing the relative index buffer (315).

Example 34 may include the subject matter of one or more of examples 30 to 33, wherein the data associated with the second entry of the vertex buffer (305) is cached data associated with the second entry of the vertex buffer (305), the apparatus (305) further includes a buffer indexer (330) to calculate an index value corresponding to the current index offset by the first relative index, and the invoker (335) is to call the rasterizer (110) using the index value to cause the rasterizer (110) to access the cached data associated with the second entry of the vertex buffer.

Example 35 may include the subject matter of one or more of examples 30 to 33, wherein the invoker (335) is further to 91) when a vertex cache (215) is present, access first data from the vertex cache (215), the first data obtained from previous rasterization processing of the second entry of the vertex buffer (305), and (2) when the vertex cache (215) is not present, fetch second data included in the second entry of the vertex buffer (305) and cause the rasterizer (210) to perform rasterization using the fetched second data.

Example 36 may include the subject matter of one or more of examples 30 to 35, and may further include a redundancy checker (310) to (1) compare entries of the vertex buffer (305) with past entries of the vertex buffer (305) within a prior number of vertex buffer entries, the prior number of entries being based on a relative index size, and (2) in response to the first entry of the vertex buffer (305) being determined to match the second entry of the vertex buffer (305), set the first relative index equal to an offset between the first entry of the vertex buffer (305) and the second entry of the vertex buffer (305).

Example 37 is a method to process a vertex buffer (305), the method including accessing a first relative index stored in a relative index buffer (315), the first relative index specifying an offset from a current index selecting a first entry of the vertex buffer (305). The method of example 50 also includes, in response to the first relative index being a nonzero value, processing data associated with a second entry of the vertex buffer (305) to determine a rasterizer output associated with the first entry of the vertex buffer (305), the second entry of the vertex buffer (305) being selected using the current index offset by the first relative index.

Example 38 may include the subject matter of example 37, and may further include, in response to the first relative index being zero, fetching and processing the first entry of the vertex buffer (305) to determine the rasterizer output associated with the first entry of the vertex buffer (305).

Example 39 may include the subject matter of examples 37 and/or 38, wherein the first relative index is associated with the first entry of the vertex buffer (305), and the first relative index is selected from the relative index buffer (315) using the current index.

Example 40 may include the subject matter of example 39, wherein the relative index buffer (315) stores relative indexes associated with respective entries of the vertex buffer (305), the relative index buffer (315) is accessed iteratively using the current index, and the current index is incremented at each iteration of accessing the relative index buffer (305).

Example 41 may include the subject matter of one or more of examples 37 to 40, wherein the data associated with the second entry of the vertex buffer (305) is cached data associated with the second entry of the vertex buffer (305), and processing the data associated with the second entry of the vertex buffer (305) includes (1) calculating an index value corresponding to the current index offset by the first relative index, and (2) calling a rasterizer (110) using the index value to cause the rasterizer (110) to access the cached data associated with the second entry of the vertex buffer (305).

Example 42 may include the subject matter of one or more of examples 37 to 40, wherein processing the data associated with the second entry of the vertex buffer (305) includes (1) when a vertex cache (215) is present, accessing first data from the vertex cache (215), the first data obtained from previous rasterization processing associated with the second entry of the vertex buffer (305), and (2) when the vertex cache (215) is not present, fetching second data included in the second entry of the vertex buffer (305) and performing rasterization using the fetched second data.

Example 43 may include the subject matter of one or more of examples 37 to 42, and may further include (1) comparing entries of the vertex buffer (305) with past entries of the vertex buffer (305) within a prior number of vertex buffer entries, the prior number of entries being based on a relative index size, and (2) in response to determining that the first entry of the vertex buffer (305) matches the second entry of the vertex buffer (305), setting the first relative index equal to an offset between the first entry of the vertex buffer (305) and the second entry of the vertex buffer (305).

Example 44 is a computer readable storage medium including computer readable instructions which, when executed, may cause a computer to perform the method defined in any one or more of examples 37 to 43.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to process a vertex buffer, the method comprising:
    accessing a first relative index stored in a relative index buffer, the first relative index associated with a first entry of the vertex buffer corresponding to a current index, the first relative index specifying an offset to be at least one of added to or subtracted from the current index corresponding to the first entry of the vertex buffer; and
    in response to the first relative index being a nonzero value, processing data associated with a second entry of the vertex buffer different from the first entry of the vertex buffer to determine a rasterizer output associated with the first entry of the vertex buffer, the second entry of the vertex buffer being selected using an index value based on the offset specified by the first relative index being at least one of added to or subtracted from the current index.

2. A method as defined in claim 1, further including, in response to the first relative index being zero, fetching and processing the first entry of the vertex buffer to determine the rasterizer output associated with the first entry of the vertex buffer.

3. A method as defined in claim 1, wherein the first relative index is selected from the relative index buffer using the current index.

4. A method as defined in claim 3, wherein the relative index buffer stores relative indexes associated with respective entries of the vertex buffer, the relative index buffer is accessed iteratively using the current index, and the current index is incremented at each iteration of accessing the relative index buffer.

5. A method as defined in claim 1, wherein the data associated with the second entry of the vertex buffer is cached data, and the processing of the data associated with the second entry of the vertex buffer includes:
    calling a rasterizer using the index value to cause the rasterizer to access the cached data associated with the second entry of the vertex buffer.

6. A method as defined in claim 1, wherein the processing of the data associated with the second entry of the vertex buffer includes:
    when a vertex cache is present, accessing first data from the vertex cache, the first data obtained from previous rasterization processing associated with the second entry of the vertex buffer; and
    when the vertex cache is not present:
        fetching second data included in the second entry of the vertex buffer; and
        performing rasterization using the fetched second data.

7. A method as defined in claim 1, further including:
    comparing entries of the vertex buffer with past entries of the vertex buffer within a prior number of vertex buffer entries, the prior number of entries being based on a relative index size; and
    in response to determining that the first entry of the vertex buffer matches the second entry of the vertex buffer, setting the first relative index equal to an offset between the first entry of the vertex buffer and the second entry of the vertex buffer.

8. At least one non-transitory computer readable storage medium comprising machine readable instructions which, when executed, cause a machine to at least:
    access a first relative index stored in a relative index buffer, the first relative index associated with a first entry of a vertex buffer corresponding to a current index, the first relative index specifying an offset to be at least one of added to or subtracted from the current index corresponding to the first entry of the vertex buffer; and in response to the first relative index being a nonzero value, process data associated with a second entry of the vertex buffer different from the first entry of the vertex buffer to determine a rasterizer output associated with the first entry of the vertex buffer, the second entry of the vertex buffer being selected using an index value equal to the offset specified by the first relative index at least one of added to or subtracted from the current index.

9. At least one storage medium as defined in claim 8, wherein the machine readable instructions, when executed, further cause the machine to, in response to the first relative index being zero, fetch and process the first entry of the vertex buffer to determine the rasterizer output associated with the first entry of the vertex buffer.

10. At least one storage medium as defined in claim 8, wherein the first relative index is selected from the relative index buffer using the current index.

11. At least one storage medium as defined in claim 10, wherein the relative index buffer stores relative indexes associated with respective entries of the vertex buffer, the relative index buffer is accessed iteratively using the current index, and the current index is incremented at each iteration of accessing the relative index buffer.

12. At least one storage medium as defined in claim 8, wherein the data associated with the second entry of the vertex buffer is cached data, and to process the data associated with the second entry of the vertex buffer, the machine readable instructions, when executed, cause the machine to:
call a rasterizer using the index value to cause the rasterizer to access the cached data associated with the second entry of the vertex buffer.

13. At least one storage medium as defined in claim 8, wherein to process the data associated with the second entry of the vertex buffer, the machine readable instructions, when executed, cause the machine to:
when a vertex cache is present, access first data from the vertex cache, the first data obtained from previous rasterization processing associated with the second entry of the vertex buffer; and
when the vertex cache is not present:
fetch second data included in the second entry of the vertex buffer; and
perform rasterization using the fetched second data.

14. At least one storage medium as defined in claim 8, wherein the machine readable instructions, when executed, further cause the machine to:
compare entries of the vertex buffer with past entries of the vertex buffer within a prior number of vertex buffer entries, the prior number of entries being based on a relative index size; and
in response to the first entry of the vertex buffer being determined to match the second entry of the vertex buffer, set the first relative index equal to an offset between the first entry of the vertex buffer and the second entry of the vertex buffer.

15. An apparatus to rasterize a vertex buffer using a relative index buffer, the apparatus comprising:

an index retriever to access a first relative index stored in the relative index buffer, the first relative index associated with a first entry of the vertex buffer corresponding to a current index, the first relative index specifying an offset to be at least one of added to or subtracted from the current index corresponding to the first entry of the vertex buffer; and an invoker to cause a rasterizer to process data associated with a second entry of the vertex buffer different from the first entry of the vertex buffer to determine a rasterizer output associated with the first entry of the vertex buffer in response to the first relative index being a nonzero value, the second entry of the vertex buffer being selected using an index value determined by at least one of adding the offset specified by the first relative index to the current index or subtracting the offset specified by the first relative index from the current index.

16. An apparatus as defined in claim 15, wherein, in response to the first relative index being zero, the invoker is to cause the rasterizer to process data associated with the first entry of the vertex buffer to determine the rasterizer output associated with the first entry of the vertex buffer.

17. An apparatus as defined in claim 15, wherein the relative index buffer stores relative indexes associated with respective entries of the vertex buffer, the index retriever is to access the relative index buffer iteratively using the current index, and further including a counter to increment the current index at each iteration of accessing the relative index buffer.

18. An apparatus as defined in claim 15, wherein the data associated with the second entry of the vertex buffer is cached data, and the invoker is to call the rasterizer using the index value to cause the rasterizer to access the cached data associated with the second entry of the vertex buffer.

19. An apparatus as defined in claim 15, wherein the invoker is further to:
when a vertex cache is present, access first data from the vertex cache, the first data obtained from previous rasterization processing of the second entry of the vertex buffer; and
when the vertex cache is not present:
fetch second data included in the second entry of the vertex buffer; and
cause the rasterizer to perform rasterization using the fetched second data.

20. An apparatus as defined in claim 15, further including a redundancy checker to:
compare entries of the vertex buffer with past entries of the vertex buffer within a prior number of vertex buffer entries, the prior number of entries being based on a relative index size; and
in response to the first entry of the vertex buffer being determined to match the second entry of the vertex buffer, set the first relative index equal to an offset between the first entry of the vertex buffer and the second entry of the vertex buffer.

21. An apparatus as defined in claim 15, further including a display device to display the rasterizer output.

* * * * *